(12) United States Patent
Thubert et al.

(10) Patent No.: US 7,822,064 B2
(45) Date of Patent: Oct. 26, 2010

(54) BACKHAUL-LEVEL CALL ADMISSION CONTROL FOR A WIRELESS MESH NETWORK

(75) Inventors: Pascal Thubert, La Colle sur Loup (FR); Patrick Wetterwald, Mouans Sartoux (FR); Vincent Jean Ribiere, Biot (FR); Bretton Lee Douglas, San Jose, CA (US); Johannes Petrus (Jan) Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/537,728

(22) Filed: Oct. 2, 2006

(65) Prior Publication Data
US 2008/0080414 A1   Apr. 3, 2008

(51) Int. Cl.
*H04J 3/22* (2006.01)
*H04W 4/00* (2009.01)

(52) U.S. Cl. ...................... 370/468; 370/328
(58) Field of Classification Search .............. 370/468; 709/249
See application file for complete search history.

(56) References Cited

U.S. PATENT DOCUMENTS

| | | | |
|---|---|---|---|
| 6,816,706 B1* | 11/2004 | Hohnstein et al. | 455/25 |
| 2002/0097674 A1* | 7/2002 | Balabhadrapatruni et al. | 370/229 |
| 2003/0123388 A1* | 7/2003 | Bradd | 370/230 |
| 2005/0138155 A1* | 6/2005 | Lewis | 709/223 |
| 2006/0083186 A1* | 4/2006 | Handforth et al. | 370/310 |
| 2006/0166128 A1* | 7/2006 | Gogolides et al. | 430/270.1 |
| 2006/0171314 A1 | 8/2006 | Qian et al. | 370/230 |
| 2007/0086406 A1* | 4/2007 | Papasakellariou | 370/343 |
| 2007/0121559 A1* | 5/2007 | Xhafa et al. | 370/338 |
| 2008/0045230 A1* | 2/2008 | Qian et al. | 455/452.1 |

OTHER PUBLICATIONS

Oppenheimer, Priscilla, "Top-Down Network Design," 2004, Cisco Press, 2nd Edition.*
"Cisco Wireless LAN Controller Configuration Guide" Mar. 2006, Cisco Systems, Inc. Software Release 3.2.*
Gast, Matthew, "802.11 Wireless Networks: The Definite Guide," Apr. 25, 2005, O'Reilly Media, Inc., 2nd Edition.*
P.-Y. Wu, Y.-C. Tseng and H. Lee, "Design of QoS and Admission Control for VoIP Services over IEEE 802.11e WLANs", National Computer Symposium, 2005, Taiwan. Available on Aug. 17, 2006 as www.csie.nctu.edu.tw/~yctseng/papers.pub/mobile69-voip-qos-ncs2005.pdf.
F. Németh, P. Barta and J. Bíró, "Network Level Call Admission Control Algorithms for Generalized Processor Sharing Scheduling Discipline," Proceedings 2003 ISCC, p. 1299, Eighth IEEE Symposium on Computers and Communications, 2003.

(Continued)

*Primary Examiner*—Jason E Mattis
*Assistant Examiner*—Stephen J Clawson
(74) *Attorney, Agent, or Firm*—Dov Rosenfeld; Inventek

(57) ABSTRACT

One embodiment includes tracking utilization of the backhaul wireless bandwidth of a mesh network related to time sensitive packet data, receiving a call admission request for a call from a client station of a first mesh access point of the mesh, ascertaining using the tracked utilization whether to approve the call admission request using a backhaul call admission control method, and approving the call by sending a positive call admission response if the backhaul call admission control method approves the call and if an access level call admission control method ascertains to approve the call admission request at the access level.

25 Claims, 11 Drawing Sheets

OTHER PUBLICATIONS

H.-Y. Wei, K. Kim, A. Kashyap and S. Ganguly, "On Admission of VoIP Calls over Wireless Mesh Network," IEEE International Conference on Communications (ICC 2006), Istanbul, Turkey, Jun. 2006.
Cisco Systems, Inc., "Call Admission Control," Chapter 9 in "Cisco Unified Communications SRND Based on Cisco Unified CallManager 4.x," downloaded Jan. 5, 2007 at http://www.cisco.com/univercd/cc/td/doc/product/voice/c_callmg/4_2/srnd4_2/uc4_2/42cac.pdf, Cisco Systems, Inc., San Jose, CA.
PCT International Search Report on PCT Application PCT/US07/78310.
PCT Preliminary Report on Patentability for PCT Application No. PCT/US2007/078310 mail on Apr. 16, 2009.

* cited by examiner

BACKHAUL-LEVEL CALL ADMISSION CONTROL FOR A WIRELESS MESH NETWORK

TECHNICAL FIELD

The present disclosure relates generally to wireless packet networks.

BACKGROUND

Wireless mesh networks are becoming ever more popular. In a wireless mesh network, e.g., a wireless mesh network that conforms to one of the IEEE 802.11 wireless local area network (WLAN) standards, wireless access points (APs) are coupled together as mesh nodes, called mesh access points (mesh APs) in a mesh via a wireless backhaul. One mesh node is coupled to a wired network. A routing protocol is used to route between the different mesh nodes. Such multi-hop routes form the backhaul network for the mesh. The routes between mesh access points typically follow a tree topology, with the root of the tree called the root access point (root AP, RAP, and root mesh AP), and typically connected to a wired network. The access network is for transport of data, e.g., from a client station of a mesh access point to a node in the wired network. If the mesh access point of the client station is several hops from the root AP in the tree topology, the transport of the packets from that access point to the root AP is along the backhaul of the mesh network.

To support various integrated services involving time-sensitive data, such as voice over IP (VoIP) and multimedia services with a certain quality of service (QoS) requirement in wireless networks, resource provisioning is a major issue. Call admission control (CAC) is a provisioning strategy to limit the number of call connections into the networks in order to reduce the network congestion and call dropping. CAC is also an issue for wireless mesh networks. In addition to the issues that exist for all wireless networks, a wireless mesh network uses a multi-hop radio backhaul network to transport traffic. It may be that there is some medium contention that can prevent real-time applications, like voice, from operating properly. To provide call admission control in a wireless mesh network, it is advantageous to include backhaul CAC to account for the limited capacity of the backhaul network.

Typically, a wireless mesh network topology is formed by the nodes of a network establishing links between themselves according to one or more metrics, called routing metrics herein, such as the link speed to a neighbor, interference, the signal-to-noise ratio, bit error rate (BER), packet error rate, and so forth. Such routing metrics may not help build call capacity for time sensitive data for which the QoS is important.

SUMMARY

In one embodiment, access points includes respective backhaul radio interface, and a backhaul CAC method is based on collected metrics gathered on the backhaul radio interface at the root access point and also in one or more mesh access point between the wireless client station and the root access point at regular time intervals. Such metrics are: existing number of calls, packet loss, latency, interferences, signal strength and so on. A backhaul mesh CAC method operates at a backhaul mesh level based on metrics gathered at the time of a call, and accepts or rejects the call based on the resources available in the mesh backhaul. This allows the support of time sensitive data services, e.g., voice or video calls over a multihop radio network One embodiment is a method implemented in the root access point of a mesh network, or in a controller of the root in the case that the root access point is a lightweight access point. Another embodiment is a logic embodiment in tangible media for execution that when executed, e.g., by a processor or processors in the root access point or its controller, implement the method. The mesh network is part of an access network and includes the root access point and at least one mesh access point. The mesh access points and root access points linked by a backhaul network comprising a set of backhaul links that have a tree topology in which the root access point is the root of the tree topology.

One embodiment of the method includes tracking bandwidth utilization the backhaul network, and receiving a call admission request for a time sensitive packet data call from a client station of a first mesh access point of the wireless mesh network. The method also includes ascertaining using the tracked bandwidth utilization whether or not the backhaul network is likely to have sufficient capacity to carry the call, the ascertaining using a backhaul call admission control method, and, in the case that the ascertaining step/process ascertains that the backhaul network is likely to have sufficient capacity for the call and further, in the case that an access level call admission control method operative to ascertain whether the access network can support the call, ascertains to approve the call at the access network level, sending a positive call admission response.

In one embodiment, the call admission request identifies a QoS access class, and wherein the backhaul call admission method includes: computing a first allocation of bandwidth for the call admission request; and approving the call if the computed first allocation is less than an amount of the backhaul bandwidth available to a QoS access class identified in the call admission request.

In one embodiment, the available amount of the backhaul bandwidth is based on one or more of an access category bandwidth reservation, a roaming-in bandwidth reservation and/or the tracked utilization of the backhaul bandwidth corresponding to the QoS access class identified in the call admission request.

In one embodiment, the tracking includes tracking, relative to an access point, a percentage of backhaul channel busy time and transmission time of downlink frames.

In one embodiment, the method further includes estimating a queue utilization for the call admission request based on the current backhaul queue utilization of the QoS access class identified in the call admission request and one or more QoS parameters in the call admission request, and, wherein approval of the call admission request in the backhaul is further conditioned on the estimated backhaul queue utilization not exceeding a queue utilization threshold.

One embodiment is a method in the root access point, or in the controller thereof in the case of a lightweight root access point that includes receiving a call admission request for a call from a client station of a first mesh access point of the wireless mesh network. The call admission request includes the bandwidth requirement for the call. The method includes receiving metrics from one or more mesh nodes that are on the path between the root access point and the client station about the respective backhaul radios of the mesh nodes, and ascertaining whether the backhaul can support the call, the ascertaining using the received metrics about the backhaul radios, such that overall the call admission control ascertaining whether or not the call is to be accepted includes the ascertaining of whether the backhaul can support the call.

In one implementation, the backhaul uses the same wireless frequency band as the link between the first mesh AP and its client stations. In another implementation, the backhaul uses a different wireless frequency band than the link between the first mesh access point and its client stations, such that the first mesh access point includes a radio interface for the backhaul and an access radio interface. The overall call admission control includes the ascertaining of whether the backhaul can support the call and access-level call admission control to ascertain whether the first mesh access point can accept the call on its access radio interface.

In one implementation, one or more mesh nodes that are on the path between the root access point and the client station include information on the respective mesh node's backhaul radio in data with the call admission request as the call admission request is relayed towards the root access point, such that the receiving of the call admission request includes the receiving of the metrics.

One embodiment of the invention includes a mesh network topology creation method that is to be time-sensitive data aware, e.g., voice or video aware. The method includes determining the cost of time-sensitive data calls from a subtree of the mesh topology. In one embodiment, the method includes ascertaining whether moving the subtree to another tree, that is, roaming, would improve the global resources. One version of the method is a modified form of the well-known tree-building protocol called Adaptive Wireless Path Protocol (AWPP).

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Described herein are a method and a system for call admission control that takes into account the backhaul link between mesh nodes of a wireless mesh network. Also described herein are a method and a system for forming a tree topology amongst the mesh nodes of the wireless mesh network that take into account the effect on call capacity.

An Example Wireless Mesh Network

Figure 1:
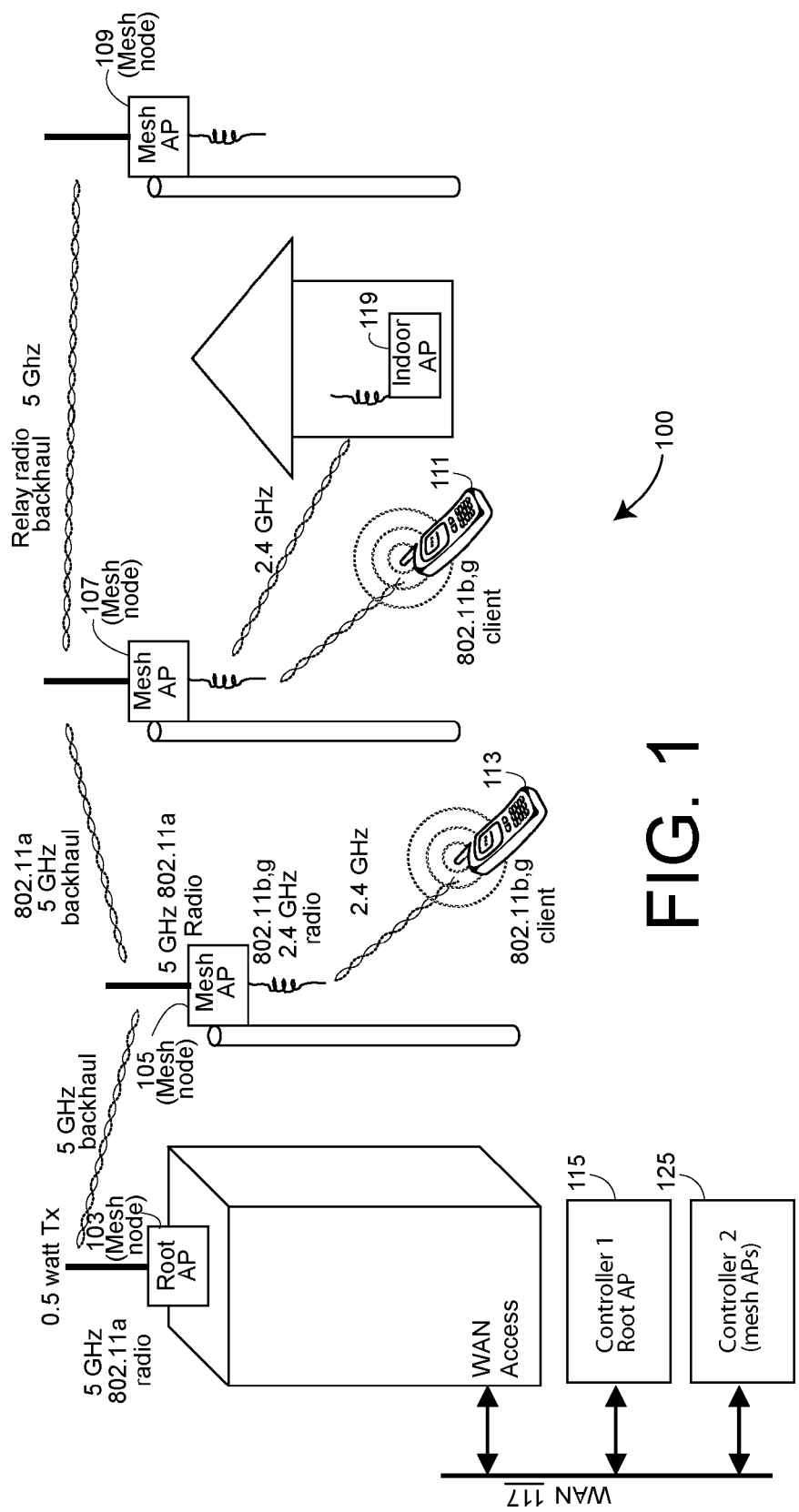
FIG. 1 shows an example wireless mesh network that includes wireless mesh access points including a root access point, and which includes an embodiment of the present invention.

FIG. 1 shows an example wireless mesh network 100 that includes wireless mesh access points (APs) 103, 105, 107, and 109, e.g., for use outdoors, which includes an embodiment of this invention. The access points 103, 105, 107, and 109 also each act as mesh nodes of a wireless mesh network, e.g., using an additional radio transceiver for the mesh backbone connection to route traffic between the mesh nodes, called mesh APs 103, 105, 107, and 109, to that used for the AP functionality. Such mesh access points may be used, for example, to cover large metropolitan areas. The example system uses the IEEE 802.11a standard for backhaul data transmission between the mesh nodes, and uses the IEEE 802.11b/g standard for client access. One client station 113 of mesh AP 105 is shown. Also shown is an AP, e.g., an indoor AP 119 that connects via the 2.4 GHz link to mesh AP 107. Furthermore, a client station 111 of mesh AP 107 also is shown.

Aspects of the present invention are described operating in the example network of FIG. 1. While a network such as mesh network 100 may be prior art, a network such as mesh network 100 that operates according to aspects of the present invention is not prior art. Thus, no prior art designation is included.

As shown in FIG. 1, the example wireless mesh network 100 includes two types of mesh nodes: a root access point (root AP, RAP, root mesh AP) 103, shown here on the roof of a building, and a mesh access point (mesh AP, MAP) 105, 107, and 109 each shown here on a pole-top. Each of these also acts as an access point. A mesh node without the AP capability is simply called a mesh node, and in this description, mesh APs can act as simple mesh nodes when there are no client stations, or if the wireless AP capabilities are disabled.

In one embodiment, the mesh access points 103, 105, 107, and 109 are "light-weight" access points whose AP functionalities are centrally controlled by, and work together with an entity in the wired network called a "WLAN controller" (WLC), or simply a controller. Each mesh AP can be controlled by a single controller, or some of the mesh APs can be controlled by a first controller, while others by another controller. In the example network 100, the root AP is controlled by a first controller 115, while the mesh APs 105, 107, and 109 are controlled by a second controller 125. The functionality of each of these access points is managed by messages between the corresponding WLAN controller 115 or 125 and the AP using a protocol called the Lightweight AP Protocol (LWAPP), which is the basis of a draft IETF specification known as Control And Provisioning of Wireless Access Points (CAPWAP) protocol. See for example www^DOT-^capwap^DOT^org, where ^DOT^ denotes the period "." in the actual URL.

The WLAN controllers 115 and 125 are coupled to the root AP 103 by a network, shown here as a wired wide area network (WAN) 117.

Note that alternate embodiments of the invention can operate with mesh access points that include the AP functionality in the mesh AP itself, so are not so-called lightweight APs. In terms of understanding, such a situation can be thought of as being the same as the mesh or root AP having a separate controller co-located within the mesh or root AP itself.

The mesh access points shown in FIG. 1 when coupled to the corresponding controller 115 or 125 typically use a tree-based routing algorithm. A tree topology for the wireless backhaul between mesh nodes is built by root APs and mesh APs as they find each other and attempt to select a parent that provides a suitable path to the root of the tree topology, which in FIG. 1 is the root mesh AP 103 connected to its Controller 115. Once the tree topology is built, the parents are then maintained on a periodic basis. One such well-known tree-building method is called Adaptive Wireless Path Protocol (AWPP).

The description herein assumes a wireless network that operates according to the IEEE 802.11 wireless local area network (WLAN) standard.

Recall that root access points such as root AP 103 are mesh APs that have a direct connection to the wireless mesh controller. In one embodiment, the wireless mesh controller is implemented in the same network device as the controller 115 that is part of a wired network, and that may further provide an uplink to other networks, e.g., the Internet, or some other wired network. Thus, as used herein, the root AP 103 is a mesh AP that has a network interface to the controller 115 in addition to a backhaul wireless interface to connect to other mesh nodes. In one embodiment, the root AP 103 also can act as an access point, and for this can have a second wireless interface to connect with client stations, acting as the AP for these client stations. Note that FIG. 1 does not show such a second wireless interface to the root AP 103.

Thus, the root AP 103 has a direct LWAPP connection back to a controller 115 that manages the mesh network, e.g., to form the loop-free tree topology.

A root AP 103 uses its backhaul wireless interface to communicate to neighboring mesh APs 105, 107, and 109. Thus, root APs are the root nodes to any bridging or mesh network and connect a bridge or mesh network to the wired network. Root APs form the roots of any wireless mesh networks that have a tree topology.

As used herein, mesh APs are APs that are also mesh nodes. FIG. 1 shows mesh APs 105, 107, and 109. The architectures discussed herein are when the mesh nodes also are operative as lightweight APs. Mesh APs 105, 107, and 109 are mesh nodes and APs that have no wired connection to a controller such as controller 125 that controls the AP functionality of each mesh AP. A mesh AP 105, 107, 109 has a backhaul wireless interface to connect to other mesh nodes, shown here as an 802.11a 5 GHz radio interface. In one embodiment, a mesh AP 105, 107, 109 has a second wireless interface, shown here as an 802.11b,g 2.4 GHz radio interface to connect with client stations, acting as an AP for the client stations. They can be completely wireless supporting clients, communicating to other mesh APs and root APs to access an external network, or as described in the following paragraph, a mesh AP can have a wire interface connectable to a wired network, and serve a bridging entity to a remote wired network.

Because mesh APs form point-to-point or point-to-multi-point connections, and additionally and simultaneously, act as an AP, a mesh AP typically includes at least two radio transceivers that can operate simultaneously, as described above. However, the CAC aspects of the present invention also can operate in a mesh network of mesh APs in which the backhaul uses the same frequency band as the radio interface to client stations. This is the case, for example, for mesh APs that include a single radio for both access communication and the backhaul.

Not shown in FIG. 1 are mesh nodes (MPs) that act as wireless bridging nodes, but that do not include the AP functionality. Such mesh nodes may be included in the network.

Embodiments of the methods described operate in a wireless mesh station that acts as a root AP. The operation is, for example, by executing logic embodied on tangible media that is executable and that when executed on one or more processors, carries out a CAC method. Such logic can be, for example, software that resides in the wireless mesh station. One embodiment of the wireless mesh station includes two simultaneous operating radio transceivers. One of the radio transceivers operates the IEEE802.11b/g protocol (MAC and PHY) in the approximately 2.4 GHz band to allow wireless access connections to 802.11b/g clients. The second radio transceiver operates the IEEE802.11a protocol in the approximately 5 GHz band to allow point-to-point (P2P) connections, point-to-multipoint (P2MP) connections, and connections between mesh nodes in a mesh, called the backhaul wireless connection, as described herein. Another embodiment includes only a single radio, so that both backhaul and the access wireless communication use the same radio transceiver. Note that other embodiments use other frequency bands, and indeed, other embodiments operate under other standards other than the IEEE 802.11 standard. Furthermore, in some versions, more than two radios may be included. Furthermore, in a simple mesh node, a single radio transceiver may be included.

Figure 2:
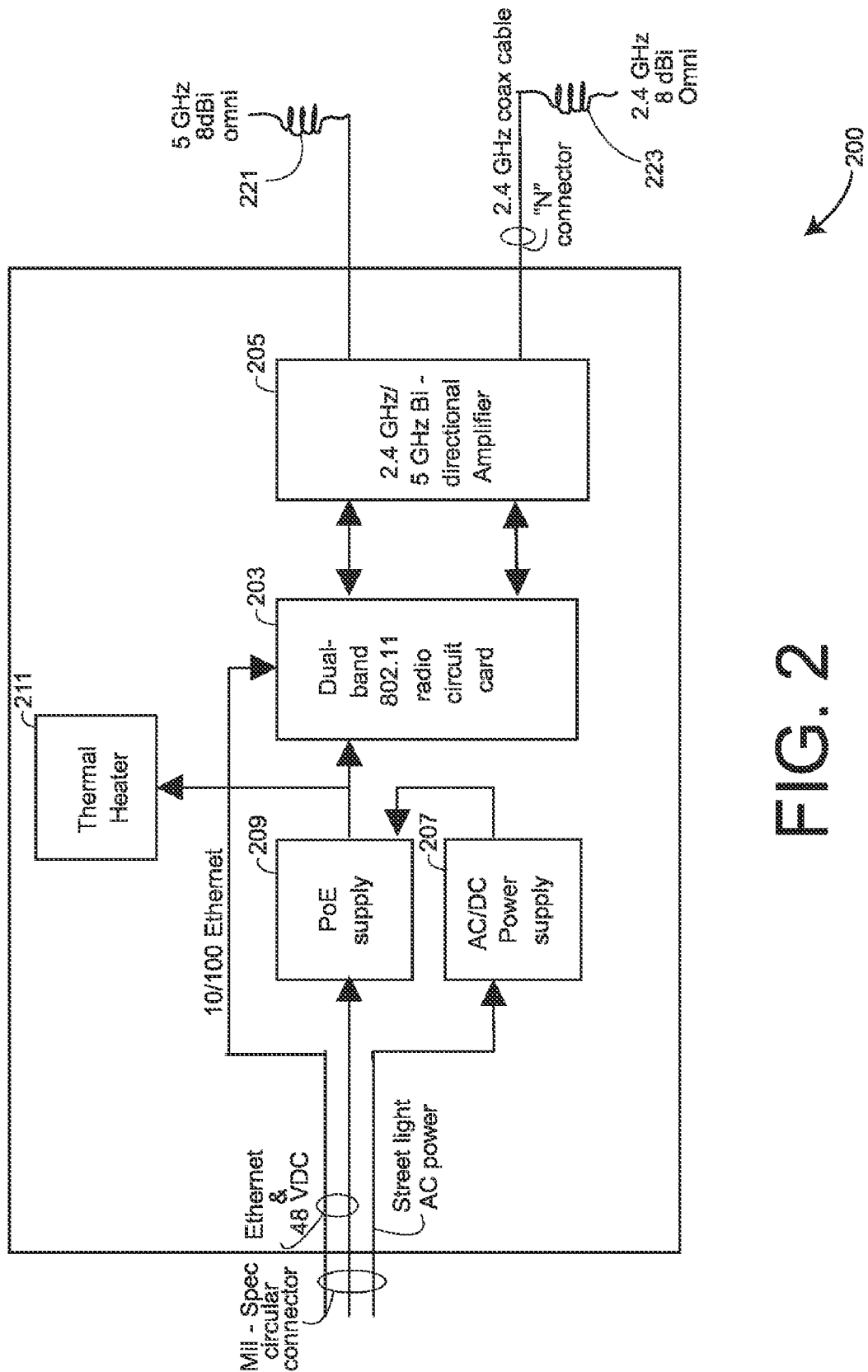
FIG. 2 shows a simplified block diagram of a dual-radio wireless station used in one embodiment for the root AP of the example mesh network shown in FIG. 1.

FIG. 2 shows a simplified block diagram of a dual-radio wireless station 200 used in one embodiment for mesh APs 105, 107, and 109, and for the root AP 103. While a station such as station 200 may be prior art, a station such as station 200 that includes software for operating according to one or more aspects of the present invention, is not prior art. Thus, no prior art designation is included. The station 200 includes a dual-band radio circuit card 203, a bi-directional amplifier 205, a WLC power supply 207, a power-over-Ethernet (PoE) power supply 209, a thermal heater 211, and external connectors. One version of the wireless mesh station is powered from an extended range WLC power supply 207 accepting an input of 95 to 260 VAC. The wireless mesh station contains a ½-watt transmit amplifier in the 5 GHz band in 205, and sends the 5 GHz band signal out of a high gain omni-directional antenna 221. For operation as an access point (AP), the wireless mesh station contains a complete 2.4 GHz IEEE 802.11b/g radio with a high gain omni-directional antenna 223 to connect to IEEE802.11b/g clients.

Figure 3:
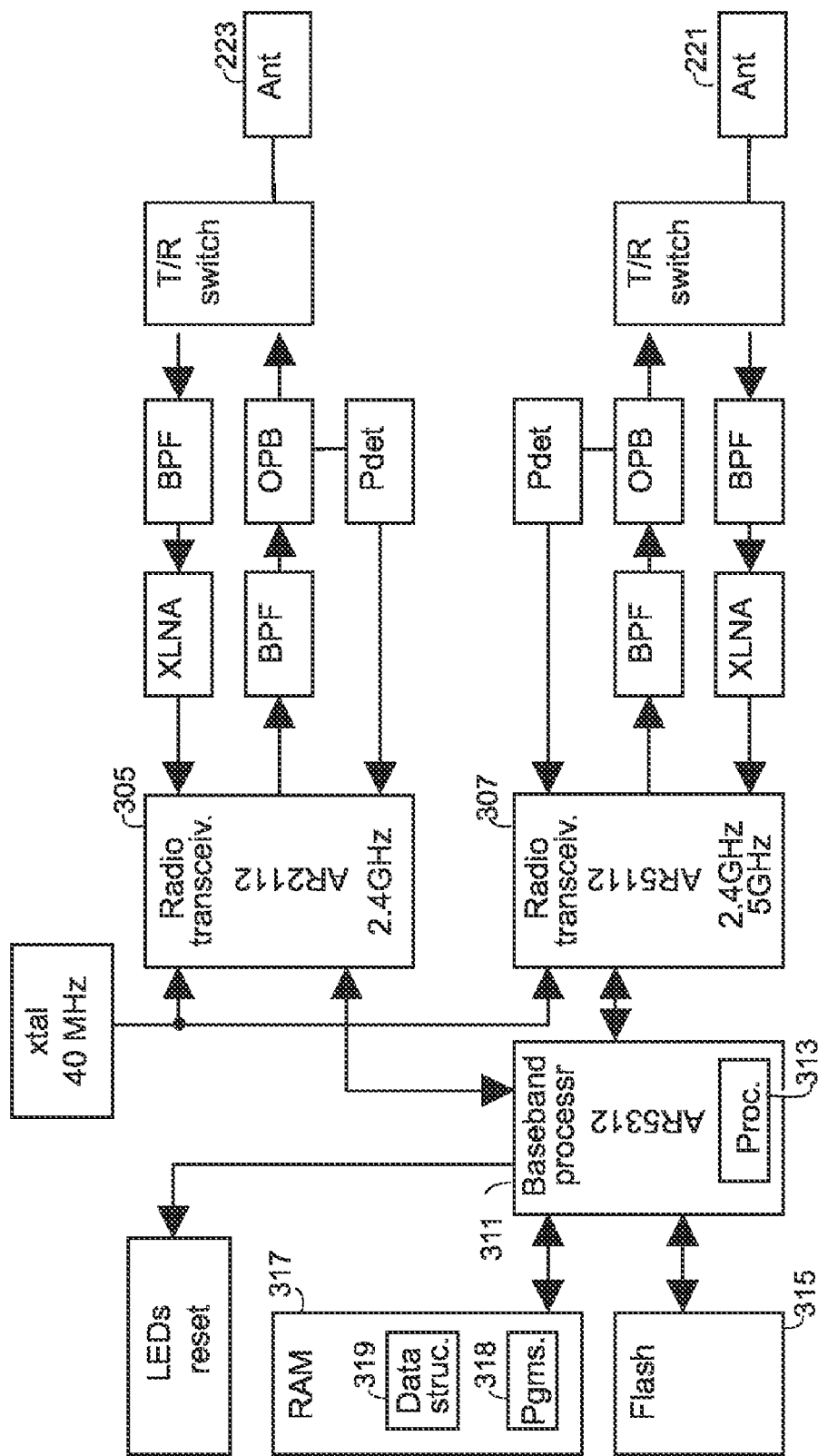
FIG. 3 shows a simplified block diagram of one embodiment of the dual-band radio circuit of the mesh station of FIG. 2.

FIG. 3 shows a simplified block diagram of one embodiment of the dual-band radio circuit card 203 of the mesh station of FIG. 2. The dual-band radio circuit card 203 has both a 2.4 GHz 802.11b/g radio and a 5 GHz 802.11a radio. These radios can operate simultaneously. The circuit card includes a chip set by Atheros Communications (San Jose, Calif.). The radio front-end includes two transceiver integrated circuits, one an Atheros AR1032 integrated circuit 307 that can operate in both the 2.4 and the 5 GHz bands, and is used for the 5 GHz, and the second an Atheros AR2112 integrated circuit 305 that operates only in the 2.4 GHz band, and is used for the AP operations to connect to client stations. Each front-end transceiver 305, 307 is coupled to an Atheros AR5312 used as a baseband processor 311. The Atheros AR5312 contains a 220 MHz MIPs microprocessor, a SDRAM controller, a Flash controller, two IEEE 802.3 Ethernet MACs, a UART, a low speed UART, GPIO, two IEEE 802.11 MACs, and two IEEE 802.11 baseband PHYs, along with two sets of ADCs and DACs. The baseband processor AR5312 chip 311 is coupled to flash memory 315 that includes some factory settings, and to a memory—a RAM 317. The RAM 317 includes programs 318 in the form of instructions, that when executed by the processor 313 of the AR5312 chip 311 shown in the block marked Proc. to implement one or more aspects of the present invention that are carried out at a mesh AP or root AP.

The RAM 317 also stores some of the data structures 319 used to implement one or more aspects of the invention. The RAM 317 maintains the forwarding data structure in 319 that includes bridging information and routing information, and also the adjacency data structure in structures 319.

In one embodiment, one or more state machines are operative in the mesh AP. Depending on the role of the mesh AP, e.g., as a child mesh AP, a parent mesh AP, a root AP, different instances of the state machine may be instantiated, e.g., for each role. In one embodiment, the instantiations operate as software that when executed on the MIPS microprocessor 313 of the radio, execute the state machine instance. The software resides as instructions as part of the programs 318 in the memory 317.

Returning to FIG. 1, in addition to the controller(s), e.g., controller 115, there may be a Remote Authentication Dial-In User Service (RADIUS) server coupled to controllers 115 and 125. The RADIUS server acts as an authentication server (AS). Other servers such as a DNS server, A DHCP server and a wireless network control server may be present. There also may be more than one instance of any of these servers.

The coupling of the controller 115 to the root AP of a mesh may be direct, or via a network, e.g., network 117 of FIG. 1. In one embodiment, the coupling is via a fast network such as a Gigabit Ethernet.

Figure 4:
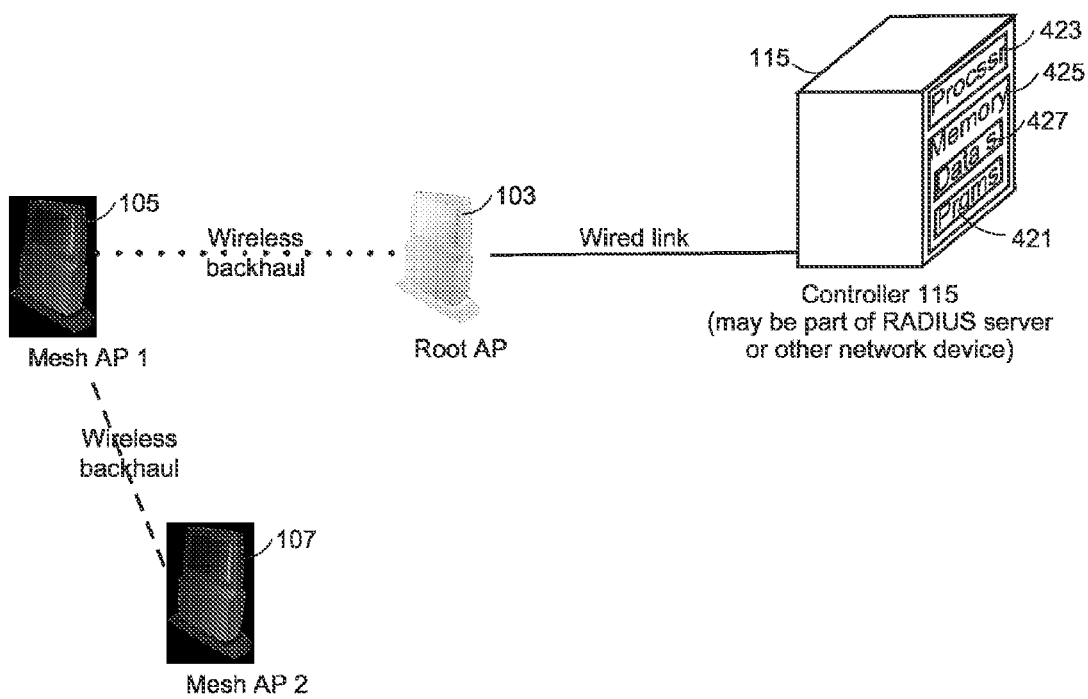
FIG. 4 shows a simplified representation of the controller of the root access point of the network of FIG. 1 that includes an embodiment of the present invention.

FIG. 4 shows a simplified representation of the controller 115 in order to show some of the elements of the device. In one embodiment, the controller 115 includes a controller processing system that has a controller host processor 423 and a controller memory 425 coupled to the controller processor 423 via a bus subsystem (not shown). Some aspects of the present invention are in the form of software, i.e., computer readable instructions 421 that when executed by the controller processor 423 carry out one or more steps of a method embodiment of the invention. Thus, aspects of the invention are in the form of instructions 421 carried in a carrier medium, e.g., memory 425.

Some aspects of the invention are managed by one or more state machines operative in the controller 115 that are implemented in the form of software (instructions), also shown as instructions 421 in memory 425, that when executed on the controller host processor 423 cause the processor to implement the state machine(s). One such state machine is a state machine that runs aspects of the backhaul CAC method described herein.

Several data structures 427 are used in the controller 115 carrying out its function. In one embodiment, such data structures 427 are maintained in the processing system, e.g., in the memory 425 coupled to the controller host processor 423.

Those in the art will understand that the controller processing system in controller 115 may include a storage subsystem that has one or more storage devices such as one or more hard disks. While instructions 421 and data structures 427 are shown in memory 425, those in the art will understand that all of the instructions 421 and/or all of the data structures 427 may not be in the memory at the same time, but that rather, in general, there is a carrier medium that carries the instructions, and that carries the data structures, and that such carrier medium in one embodiment is the storage subsystem in combination with the memory.

Call Admission Control in a Wireless Network

The IEEE 802.11e standard and Wi-Fi Multimedia (WMM) based on a subset of IEEE 802.11e are known, and describe call admission control (CAC) to maintain quality of service (QoS) during WLAN congestion by limiting the number of calls per access point (AP), called a quality enhanced AP (Q-AP) in the IEEE 802.11e standard. Admission control is negotiated by the use of what is called a traffic specification (TSPEC). A client station, called a quality enhanced station (Q-STA) in the IEEE 802.11e standard, specifies its traffic flow requirements, e.g., data rate, delay bounds, packet size, or others, or a combination of such factors, and requests the access point to create a TSPEC by sending an "add TSPEC management action frame" (ADDTS frame). The AP calculates the existing load based on the current set of issued TSPECs. Based on the current conditions, the AP may accept or deny the new TSPEC request. If the TSPEC request is denied, the high priority access category inside the client station is not permitted to use the high priority access parameters, so it has to instead use lower priority parameters.

In TSPEC based WMM CAC, there is specified some fixed percentage of over-the-air bandwidth that an AP may use for time-sensitive, e.g., voice or video services traffic. The AP admits additional calls until that allocated bandwidth is depleted.

What herein is called "load-based" call-admission control (load-based CAC) is a CAC method that can take into account the fact that two or more APs may be sharing the same RF channel, commonly called BSS overlap, a common occurrence in the 2.4-GHz band of IEEE 802.11b and IEEE 802.11g, and even possible in the 5-GHz band of IEEE 802.11a. Load-based CAC uses a set of metrics that are affected by the amount of traffic loading and/or the amount of interference on the channel, and further uses load-based CAC equations that use these metrics to determine whether a new incoming call can be admitted at an AP. Load based CAC also uses the metrics to predict how many additional calls can be admitted for the channel while maintaining QoS. In load-based CAC, each AP periodically measures and updates one or more of the utilization of the RF channel and channel interference, and/or the additional calls that the AP can admit. The AP admits a new call only if the channel has enough unused bandwidth to support that call. Thus, load-based CAC prevents over-subscription of the channel and can maintain the QoS under many conditions of WLAN loading and interference. One embodiment of load-based CAC also uses channel utilization information, e.g., whether heavily loaded or lightly loaded, for fine-tuning of parameters used in 802.11e and WMM enhanced distributed channel access (EDCA) for increasing overall WLAN time sensitive data capacity, e.g., voice or video services capacity. Note that time sensitive data packet streams are also called QoS packet streams herein.

One embodiment of load-based considers two factors, bandwidth and queuing, when making a load-based CAC admission decision. The bandwidth check measures whether there is sufficient medium time available to accept a new call. The queuing constraint determines whether the queuing delay will be kept in check so that queue overflow does not occur. Below sub-sections describe these in detail.

Call Admission Control in a Wireless Mesh Network

In one embodiment, overall CAC in a mesh network includes access network CAC to check whether resources can be committed in the access network, and further backhaul CAC to check whether resources can be committed in the backhaul. It must be observed that the mesh network operates as a multi-hop repeater, and thus, for a mesh AP, depending on the depth of the mesh AP in the mesh, i.e., the number of hops to the root AP, the resources required in the backhaul will augment with the number of hops.

In a dual-radio mesh AP, one embodiment includes two computations, one for the access network and one for the mesh network. In one embodiment, the two radios are at different frequency bands, so they do not interfere. In such a case, the access CAC computation can be done independently using a method applicable to a non-mesh AP. One example is a static access network CAC method, and another is a load-based access network CAC method.

With respect to the backhaul network, because the backhaul operates uncoordinated at a single frequency, there may be interfering traffic from co-channel APs, e.g., from the same mesh, and there may also be co-located channel interference foreign sources. Thus in one embodiment, the backhaul CAC is a load-based CAC method.

For load-based CAC in a mesh network, radio constraints are introduced to account for the limited capacity of the backhaul.

In order to support a reasonable throughput for voice or video services with a single backhaul frequency, it is expected that the mesh will have at most a depth of 2 to 3 mesh APs. It results that the whole mesh will generally be within the interference domain of the root AP of the mesh, also called the root AP (RAP) that forms the root of the backhaul tree topology, and that typically has a wired link to a network.

In one embodiment, backhaul CAC requires mesh AP measurement of radio conditions at only the root AP. The inventors have found that this provides sufficient performance because in many situations; the inventors have found that the root AP is typically the bottleneck of the backhaul. Thus, in one embodiment, the backhaul CAC operates at the root AP or, in the case that the root AP is a lightweight AP as shown in FIG. 1, at the controller 115 for the root AP, and such a root AP or its controller makes all the CAC decisions for the backhaul.

Thus in one embodiment the mesh AP, or its controller if a lightweight mesh AP, manages the access bandwidth using, for example, an existing wireless network CAC method. In such a lightweight mesh AP case, any call admission request, e.g., using a traffic specification, is encapsulated using over LWAPP. The access CAC decision is made at the mesh AP or its controller in the case of a lightweight mesh AP.

In addition, a backhaul TSPEC is also forwarded by the mesh AP to the root AP, or, in the case that the mesh AP and root AP are lightweight APs that have a mesh AP controller and a root AP controller, respectfully, the backhaul TSPEC is forwarded from the mesh AP controller to the root AP controller using an inter-controller IP encapsulation protocol. The backhaul CAC decision is made at the root AP or its controller in the case of a lightweight root AP. The answer is forwarded back to the mesh AP, e.g., via the mesh AP's controller if the mesh AP is a lightweight mesh AP.

The mesh AP reconciles the backhaul and access CAC answers and accepts the call if both answers agree.

Example Message Flows

FIGS. 5-9 illustrate example message flows for an embodiment of the CAC method for the case of mesh APs and a root AP that are lightweight APs. These LWAPP message flows use LWAPP encapsulation to pass information between a mesh AP or root AP and the respective controllers. A client station (STA) 111 has a mesh AP denoted MAP 2 with reference numeral 107. Mesh AP 2 has a controller 125. There is an intermediate mesh AP denoted MAP 1 with reference numeral 105, and a root AP (RAP) 103 that has a RAP controller 115. FIGS. 5-9 are easily modified to the case of non-lightweight mesh APs and a non-lightweight root AP by co-locating any mesh AP and its controller, e.g., mesh AP 2 and its controller 125, thus eliminating any LWAPP encapsulated message flows there between, and by co-locating RAP 103 and its controller 115, thus eliminating any IP encapsulated message flows there between. Similarly, FIGS. 5-9 can easily be modified to the case of the root AP 103 and mesh AP 2 using the same controller by eliminating any messaging, e.g., messaging using the inter-controller message protocol with IP-based encapsulation, between the root AP's controller 115 and mesh AP 2's controller 125.

Figure 5:
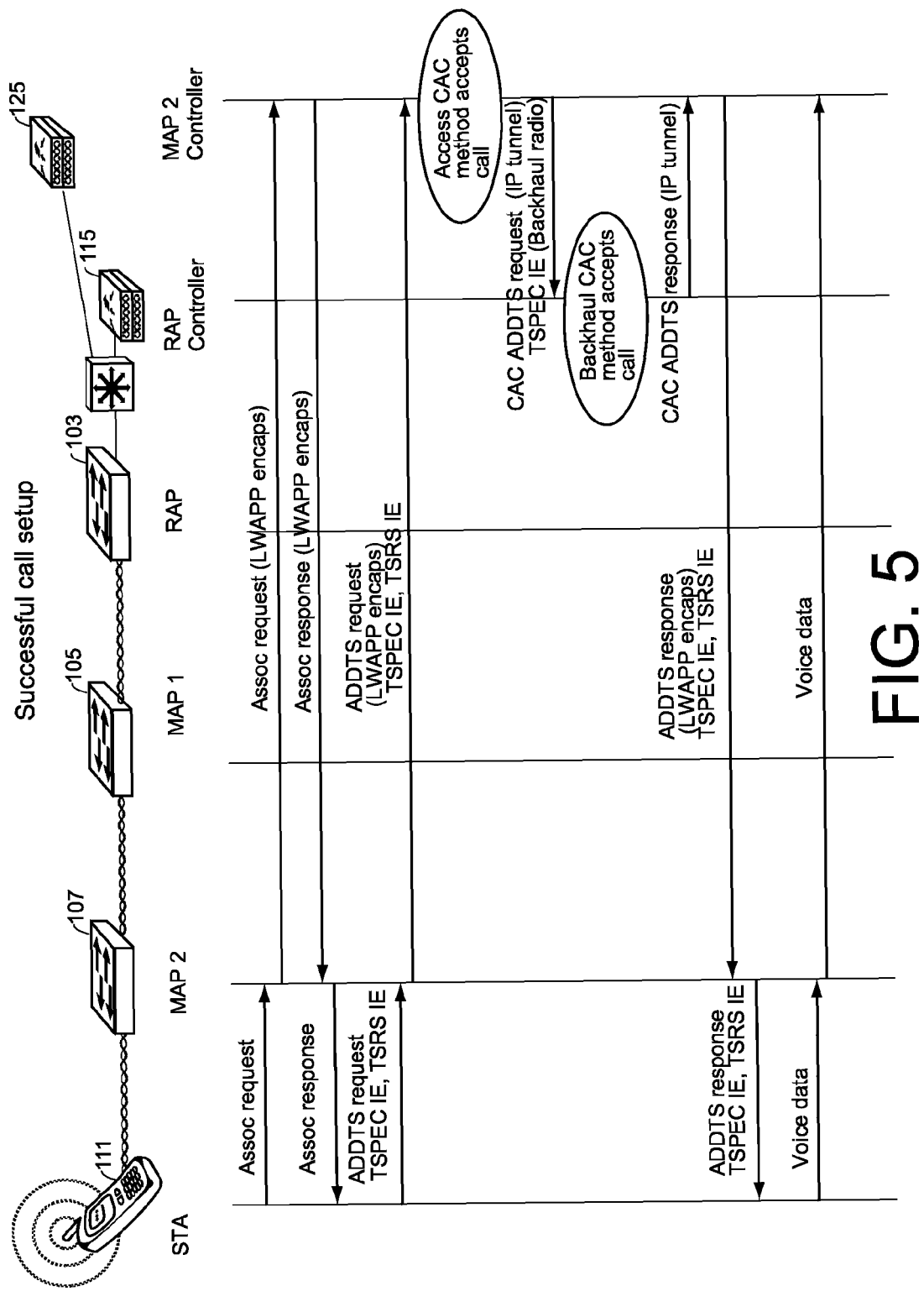
FIGS. 5-9 illustrate example message flow for an embodiment of a call admission control method for the case of mesh APs and a root AP that are lightweight APs.

FIG. 5 shows an example message flow for a successful call setup for a client station (STA) 111. Before the call setup, STA 111 associates with a mesh AP (MAP 2) by sending an association request to MAP 2. The association request is passed in an LWAPP encapsulation to the controller 125 of MAP 2. MAP 2 controller 125 sends an association response in an LWAPP encapsulation. MAP 2 sends a positive association response frame to STA 111 so that STA 111 becomes associated with MAP 2. In this example, the client station 111 initiates the call with a call admission request in the form of an ADDTS request that includes a TSPEC that contains the call requirements. The ADDTS request includes a TSPEC in the form of one or more TSPEC information elements (IEs), and optionally an indication of packet speed in what is called a traffic stream rate set (TSRS) information element. TSRS IEs are information elements that are part of Cisco Compatible Extensions (CCX) V4 and up from Cisco Systems, San Jose, Calif. In alternate embodiments, different format and mechanisms are used to transport the information with a call admission request. STA 111's AP, mesh AP 2 received the ADDTS request. This is passed to mesh AP 2's controller 125 in LWAPP encapsulation, and an access CAC method evaluates the call to determine if it can be accepted by the access network via MAP 2. When mesh AP 2 sends the original ADDTS request to its controller, in one embodiment, mesh AP 2 includes information on its backhaul. If the access network can accept the call, the call admission request is passed from MAP 2's controller 125 to the controller 115 of the root AP 103 as a CAC ADDTS request message that in one embodiment conforms to an L3 inter-controller communication protocol using IP-encapsulation. The RAP controller 115 carries out a backhaul CAC method to ascertain if the backhaul can accept the call. If yes, the RAP controller 115 send the MAP 2's controller 125 a positive call admission response to the call admission request, in the form of a CAC ADDTS response message that in one embodiment conforms to an L3 inter-controller communication protocol using IP-encapsulation. At this stage, the controller 125 combines the results of the access CAC method and the backhaul CAC method and provides MAP 2 in LWAPP encapsulation, a positive or negative ADDTS response. In this example, the ADDTS response is positive. MAP 2 107 sends its client STA 111 an ADDTS response frame to indicate the call is accepted. At this point, the voice (or video or other time sensitive data) call proceeds as shown in FIG. 5 by voice data starting from STA 111.

In addition to a call initiated for a client station that is associated with a mesh AP, the association request itself for a client station to associate can contain one or more TSPEC IEs and a TSRS IE in the case the client station wants to establish a traffic stream as part of the association.

Furthermore, for roaming, a client station sends a re-association request to a mesh AP to which it wants to roam. In one embodiment, the re-association request for a client station to roam can contain one or more TSPEC IEs and a TSRS IE to roam a call.

Figure 6:
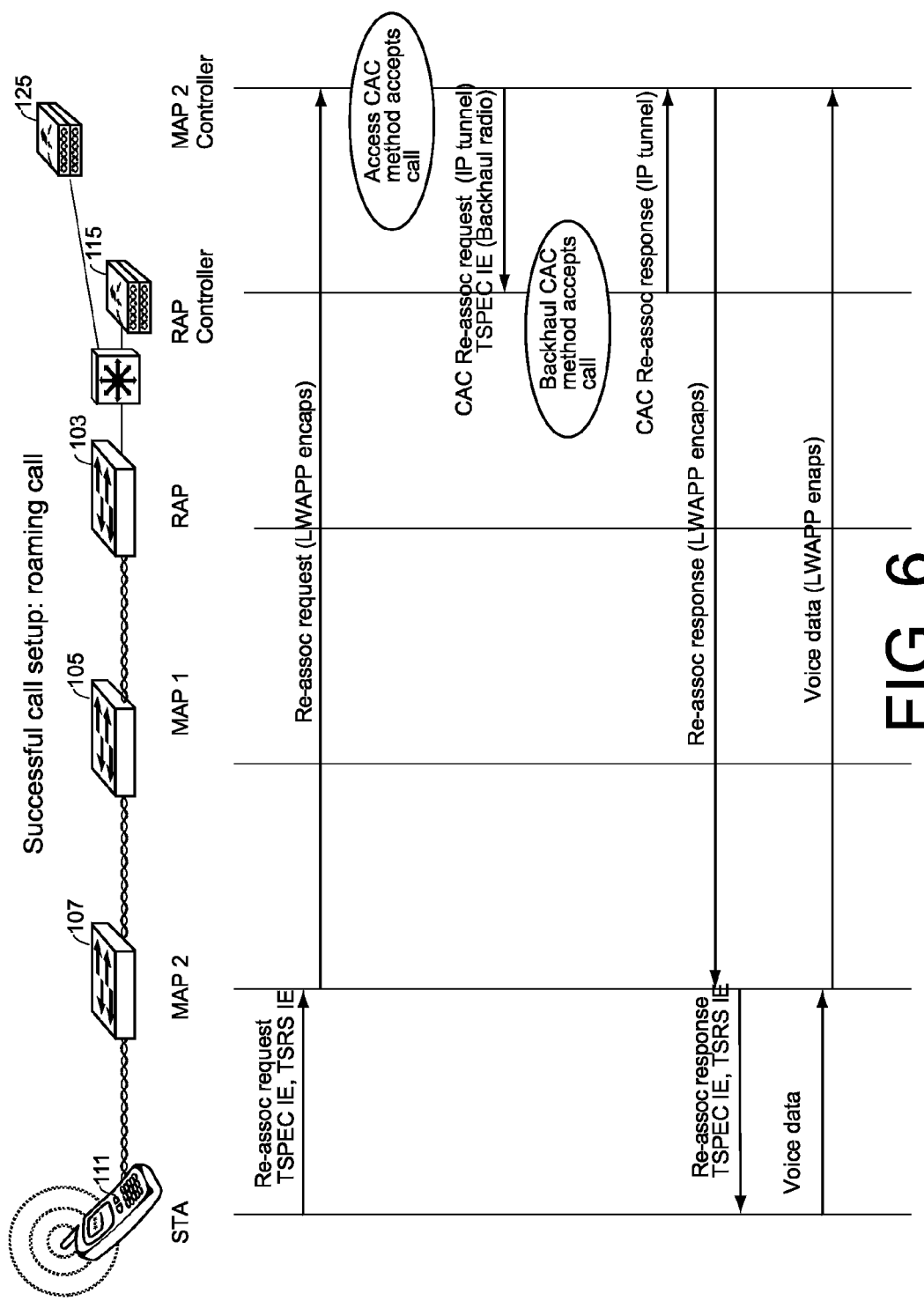

FIG. 6 shows an example message flow for a roam during a call for a client station (STA 111) in a wireless mesh network roaming to a mesh AP (MAP 2 107) according to an embodiment of the present invention. After receiving a beacon or probe response frame from MAP 2 and deciding to roam to it, STA 111 sends a re-association request to MAP 2 including information about a call in a TSPEC IE and further speed information in a TSRS IE. MAP 2 passes the re-association request to mesh AP 2's controller 125 in LWAPP encapsulation, and an access CAC method evaluates the call to determine if it can be accepted by the access network via MAP 2. If the access network can accept the call, the call admission request is passed from MAP 2's controller 125 to the controller 115 of the root AP 103 as a CAC re-association request message that in one embodiment conforms to the L3 inter-controller communication protocol using IP-encapsulation. The RAP controller 115 carries out a backhaul CAC method to ascertain if the backhaul can accept the call. If yes, the RAP controller 115 send the MAP 2's controller 125 a CAC re-association response message that in one embodiment conforms to the L3 inter-controller communication protocol using IP-encapsulation. The controller 125 combines the results of the access CAC method and the backhaul CAC method and provides MAP 2 in LWAPP encapsulation, re-association response, in this case positive. MAP 2 107 sends its client STA 111 a positive re-association response frame, so that STA becomes associated with MAP 2 107, and further, the call has been accepted and may proceed. At this point, the voice (or video or other time sensitive data) call proceeds as shown in FIG. 6.

Figure 7:
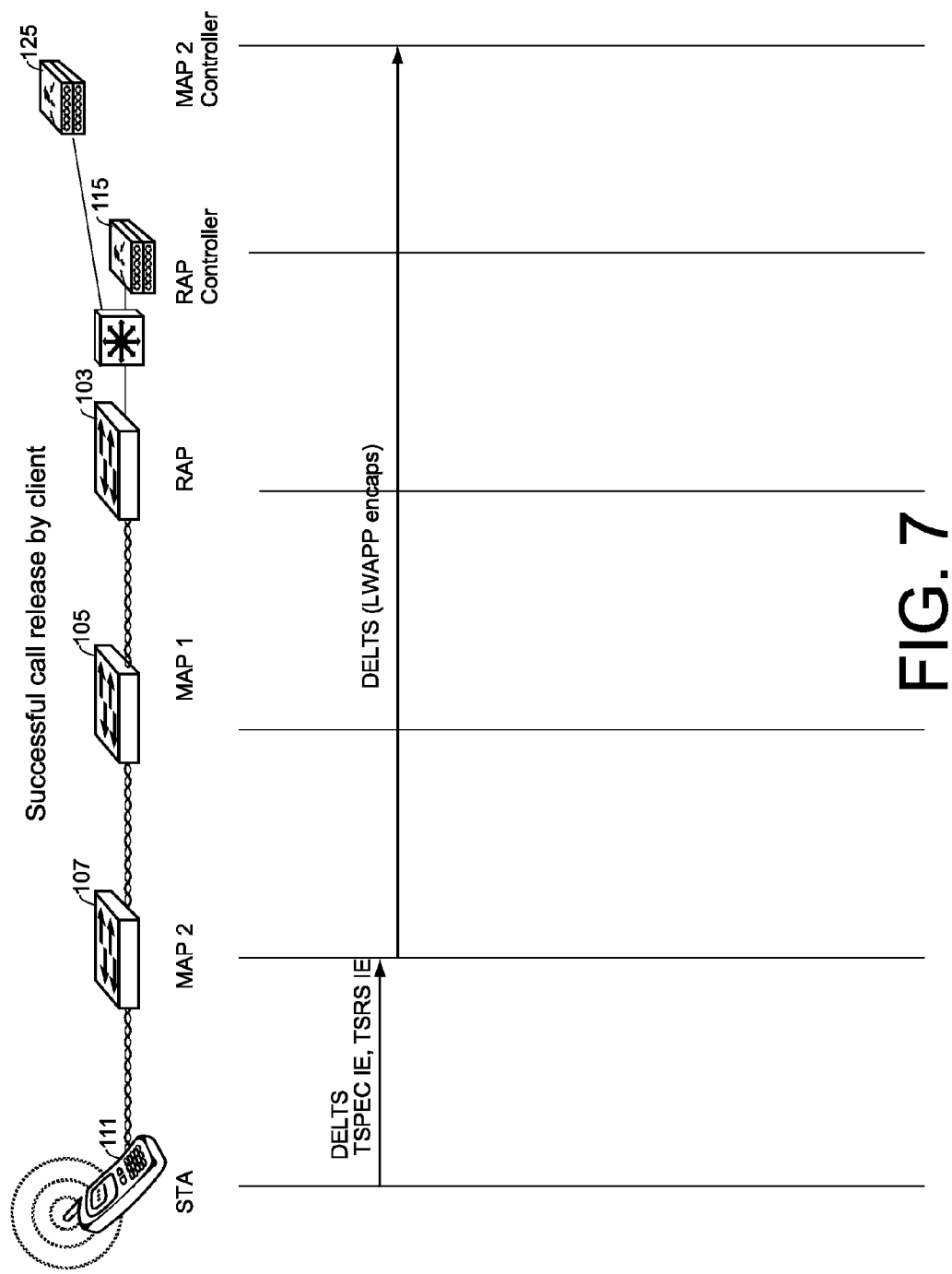

FIG. 7 shows an example message flow for a successful release of a call by a client station (STA) of a mesh AP (MAP 2) of a wireless mesh network according to an embodiment of the present invention. The client station STA 111 sends to MAP 2 107 a delete TSPEC frame (DELTS) to release a call, together with the TSPEC IE(s) and the TSRS IE. MAP 2 passes this DELTS in LWAPP encapsulation to its controller 125. The controller 125 updates its maintained information to account for the call being released.

Figure 8:
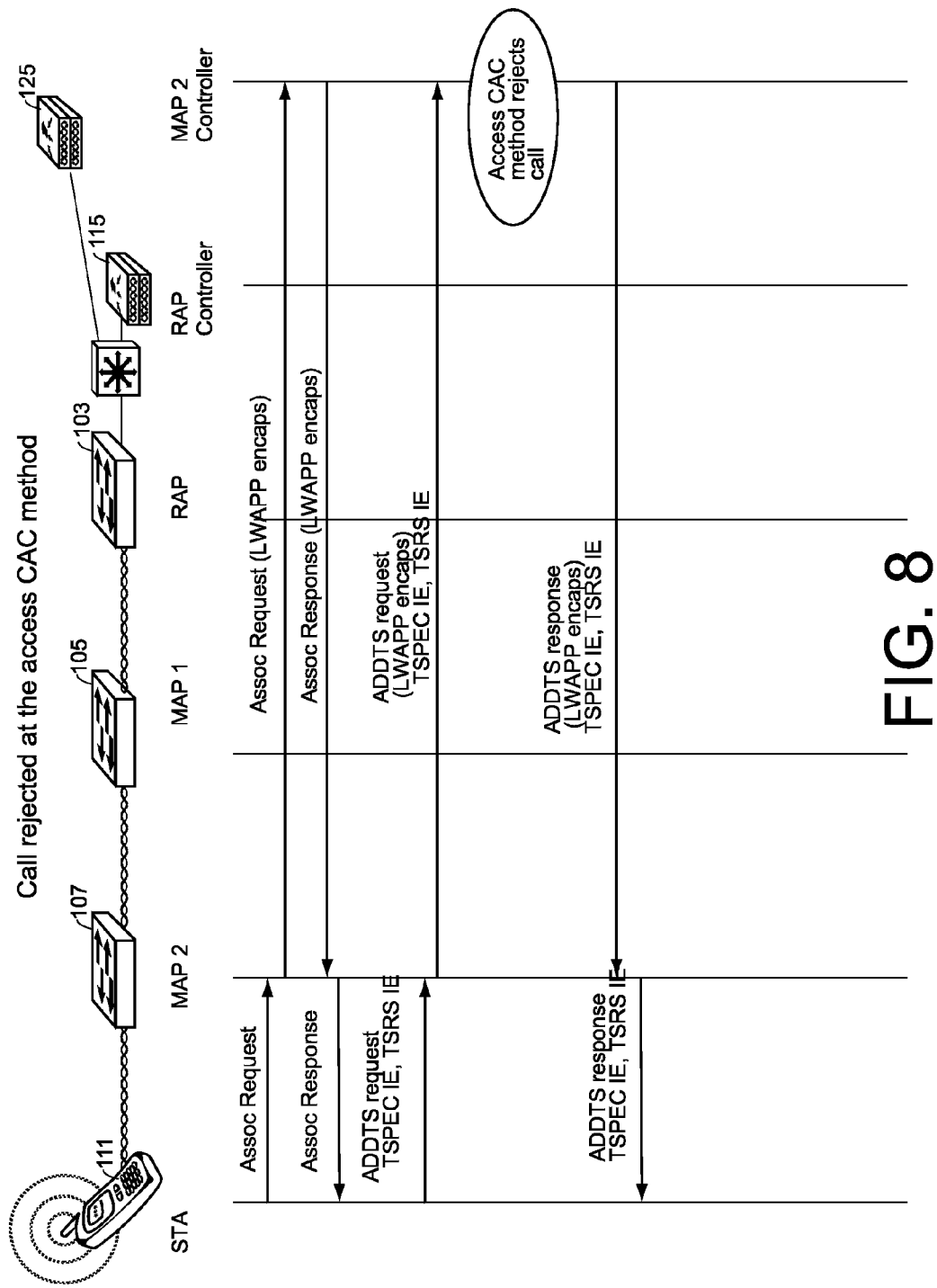

FIG. 8 shows an example message flow for an unsuccessful set up of a call by a client station (STA) of a mesh AP (MAP 2) of a wireless mesh network during which the access CAC method for MAP 2 rejects the call, according to an embodiment of the present invention. The message flow proceeds as in FIG. 5 including running the access CAC method in MAP 2's controller 125. In this example, the access CAC method rejects the call, and a negative ADDTS response to MAP 2 107, which in turn sends its client STA 111 a negative ADDTS response frame to indicate the call is rejected.

Figure 9:
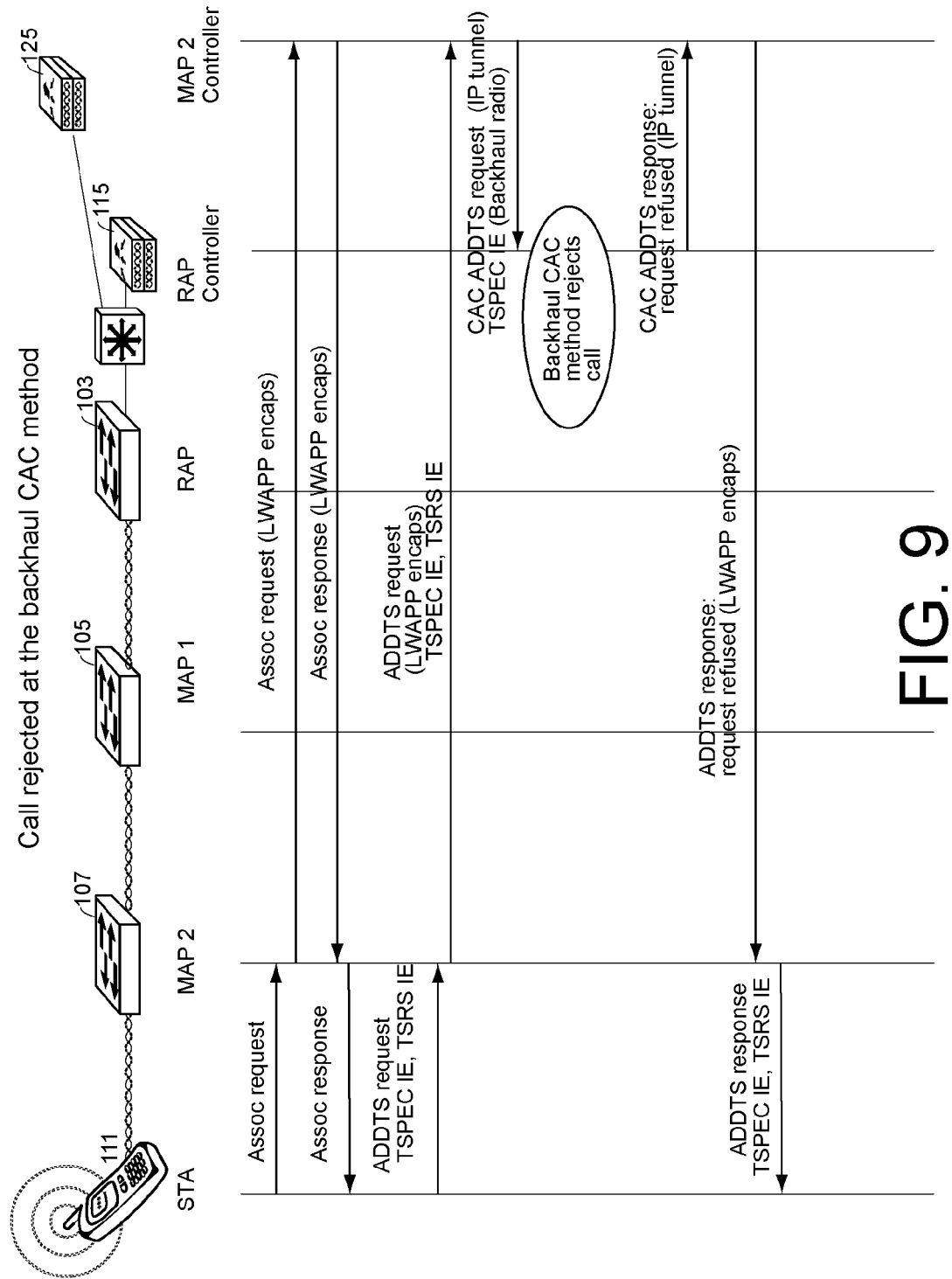

FIG. 9 shows an example message flow for an unsuccessful set up of a call by a client station (STA) of a mesh AP (MAP 2) of a wireless mesh network during which the backhaul CAC method for the root AP (RAP) rejects the call, according to an embodiment of the present invention. The message flow proceeds as in FIG. 5 including running the backhaul CAC method in RAP's controller 115. In this example, the backhaul CAC method rejects the call, and sends a negative CAC ADDTS response message using the inter-controller protocol to MAP 2's controller 125. That controller 125 sends a negative ADDTS response in LWAPP encapsulation to MAP 2 107, which in turn sends its client STA 111 a negative ADDTS response frame to indicate the call is rejected.

As illustrated in the above-described message flows, two CAC methods are run, an access CAC method and a backhaul CAC method. These two methods need not be the same or even similar. For example, in one embodiment, the access CAC method is a conventional WMM TSPEC based method, while the backhaul CAC method is a load based method. In another embodiment, both the access and the backhaul methods are load-based methods. The computations for the access channel CAC method are done by the mesh AP of the client station requesting the call, or, in the case the mesh AP is a lightweight AP, the controller of that mesh AP.

In one embodiment, the root AP and all the mesh APs perform backhaul CAC computation. In another embodiment, the computation(s) for the backhaul is/are performed by the root AP, or in the case of the root AP is a lightweight AP, the controller of the root AP. In one version of the backhaul CAC method, the whole mesh is considered as an "extended BSS" for the needs of backhaul CAC calculations.

One aspect of load based CAC carried out on the backhaul is that such based CAC observes the consequences of existing calls as opposed to actually committing resources for a call.

In one embodiment, the one or mesh nodes that are on the path between the root access point and the client station include information on the respective mesh node's backhaul radio in data with the call admission request as the call admission request is relayed towards the root access point, such that the receiving of the call admission request at the root AP 103's controller 115 includes the receiving of the metrics of all the intermediate mesh nodes in the path. Note that one embodiment of the route forming method is QoS aware, and such a method includes using information on the respective mesh node's backhaul radio. In particular, as explained below under "QoS-aware mesh topology building," in one embodiment, each mesh node signals the QoS metrics for the hop between the mesh node and its parent is signaled up the tree all the way to the root AP. In one embodiment, each mesh access point in the path from the client station to the root AP appends a measurement IE specifying the metrics that the mesh node measures continuously, e.g., every fixed period of time, on its backhaul radio.

In one embodiment, the metrics for any particular mesh node in the path include at least one of the hop speed in the backhaul radio or a measure indicative of the interference level in the backhaul.

In particular, metrics include at least one of the transmit power, e.g., for determining the path loss in the backhaul link, the hop speed on the backhaul link, the received signal strength on the backhaul link, the bit error rate (BER) or packet error rate (PER) on the backhaul link, noise on the backhaul link, interference on the backhaul link, signal-to-noise ratio (SNR) on the backhaul link, or the signal-to-interference-noise radio (SINR) on the backhaul link, or load on the backhaul link. Other metrics also may be used and appended on each hop by the additional mesh AP on that hop.

As described below, in on embodiment, only the mesh AP 107 of the client station 111 includes information on its backhaul radio in data with the call admission request as the call admission request is relayed towards the root access point 103, such that the receiving of the call admission request at the root AP 103's controller 115 includes the receiving of the metrics from the mesh AP 107's backhaul radio.

One embodiment is for the case that the backhaul of the mesh network runs at a fixed speed. The access request includes an access speed. As described above, the mesh nodes of the mesh network form a tree topology in which each mesh node from which metrics are received at the root AP's controller 115 maintains knowledge of its position in the tree topology, including the number of hops to the root access point 103. Information on the respective mesh node's backhaul radio included in the data with the access request has an updated access speed quantity that varies as the fixed speed divided by the number of hops to the root access point, such that the cost for the requested call over the mesh backhaul can be calculated as if for a single hop access.

In one embodiment, the backhaul CAC method includes a backhaul CAC bandwidth check according to a first backhaul CAC criterion (backhaul CAC criterion 1), and a CAC queuing constraint check according to a second backhaul CAC criterion (backhaul CAC criterion 1).

Backhaul CAC Bandwidth Check

This check performed on the root AP or its controller compares the bandwidth requirements of a new call with the free resources in the air protocol.

Backhaul CAC Criterion 1:

$$\text{Is mesh}MT \leq \min(1-P_b, A_v-RR_v-P_v)? \qquad (1)$$

where, mesh MT is the backhaul mesh medium time computed by the AP's backhaul admission control method for a new call for the new TSPEC request.

$P_b$ is the relative amount of time, e.g., as the percentage of time the mesh AP's backhaul perceives that the backhaul channel is unavailable for additional QoS packets if more client stations are admitted. Thus, $P_b$ is the percentage of time that the backhaul channel is busy, e.g., busy demodulating IEEE standard 802.11 traffic, and includes the time during which the root AP 103 transmits packets in the backhaul and the time during which the clear channel assessment (CCA) report of root AP 103 indicates that the backhaul channel is busy, such as during the time when the RSSI is greater than CCA. In one implementation, an optimization may be to add SIFS between a transmitted packet and its corresponding acknowledgement, and DIFS+CWmin/2*slot before the root AP transmits a time-sensitive data packet.

$A_v$ is the relative amount, e.g., as a percentage of the backhaul channel allocated for voice or video services, which in one embodiment, is interpreted as an upper limit, thereby providing sufficient bandwidth for time sensitive data channel reserves or other purposes. In one implementation, a user, e.g., a system administrator, may configure a maximum bandwidth utilization per queue and a roaming reserve per queue. For example, the user may configure the CAC backhaul method to allocate a portion of the backhaul channel bandwidth, e.g., up to 50%) to voice or other time sensitive packet stream services.

$RR_v$ is the relative amount, e.g., as a percentage of the backhaul channel allocated for roaming reserve for voice or video services. In one implementation, root AP 103's controller 115 may derive RRv based on the voice or video call allocation. Alternatively, in one implementation, the user may manually configure an RRv value. For roaming-in calls, the RRv term is eliminated from the computation.

$P_v$ is the observed utilization of the backhaul channel or bandwidth by admitted time sensitive data, e.g., voice or video calls over the last 1-second time period. In one implementation, Pv may be described by the following expression:

$$P_v = \sum T_d + 1.1 * \sum T_{u\_vc} \qquad (2)$$

$$T_{u\_vc} = \sum (T_{voice} + DIFS + \text{slot}*CW_{min}/2 + SIFS + T_{ack}), \qquad (3)$$

where, $T_{voice}$ corresponds to the time sensitive data packets, e.g., packets for voice or video services that are correctly demodulated; also note that upstream measurements include downstream transmissions from other APs. Σ is the sum over all time sensitive data packets, e.g., packets for voice or video services that root AP 105 transmits on its backhaul, including retries.

$T_d$ is the medium time consumed by the transmission of a downlink voice or video services frame, including retries.

$T_{ack}$ is the time to transmit an acknowledgement.

Eqs (2) and (3) account for the time corresponding to successful transmissions as well as transmissions whose data frame is successfully demodulated but whose ACK is lost.

In the case of a roaming in call, admission criterion 1 becomes:

$$\text{Is mesh}MT \leq \min(1-P_b, A_v-P_v)?$$

Computation of MeshMT

The mesh medium time, denoted MeshMT, is the mesh bandwidth utilization, a value that represents a portion of the available backhaul bandwidth. In one implementation, MeshMT is based on the QoS parameters requested by a client station 111. In one implementation, MeshMT may be expressed in a number of uniform time intervals within a given period in which the backhaul CAC method allow the backhaul bandwidth to be used for the call. For example, in one implementation, the uniform time interval may be 32 μs and the time period may be one-second. Accordingly, if the backhaul CAC method provides the call with a MeshMT of 1000, the call has permission to use the backhaul bandwidth for 1000*32 μs increments per 1-second period.

The ADDTS request includes a TSPEC information element (TSPEC IE) that can be used to specify a requested set of QoS attributes, such as data rate, packet size, packetization interval, and priority. In one implementation, the stream for which QoS is requested is identified by a Traffic Stream Identifier (TSID) contained in the TSPEC IE. MeshMT based at least in part on the parameters supplied with the ADDTS request.

MeshMT depends on the number of hops in the backhaul. In on embodiment, MeshMT computation uses a surplus bandwidth allowance term that accounts for the number of hops between the mesh AP and its root AP, denoted Nhops. As a result, the other MeshMT parameters can be used as if the mesh AP was only 1 hop away.

In one embodiment, the backhaul data rate is fixed, e.g., at 18 Mb/s. Traditional medium time calculation, according to the IEEE 802.11e standard, and also the WMM specification, uses 1) a minimum PHY rate; 2) a surplus bandwidth allowance, in this case the mesh surplus bandwidth allowance rather than the 802.11e surplus bandwidth allowance (SBA); 3) a nominal MAC service data unit (MSDU) size; and 4) a mean data rate.

In the mesh backhaul case, in one embodiment, the minimum PHY rate is the backhaul rate fixed at 18 Mb/s.

The mesh surplus bandwidth allowance, denoted Mesh SBA, is a mesh specific parameter. Like the 802.11e surplus bandwidth allowance (SBA) that specifies the excess allocation of time above the stated application rates required to transport a MAC service data unit (MSDU), the mesh SBA increases when the LWAPP tunnel link quality degrades. In one embodiment, a constant value is used which is multiplied by Nhops since the more hops there are the higher the packet loss. In one version, the constant value used is 1.4.

The nominal MSDU size is application specific and is directly obtained from the received TSPEC IE. However note that to compute MeshMT for the backhaul, various encapsulations need to be accounted for: LWAPP, IP, UDP and WDS header have to be added to the access Nominal MSDU size received in the TSPEC.

The mean data rate is application specific and is directly obtained from the received TSPEC.

In one embodiment, the formula for determining the MeshMT is as per the Wi-Fi Multimedia WMM specification:

$$MeshMT = \text{mesh } SBA * pps * \text{medium time per frame exchange} * 2 \quad (4)$$

where, mesh $SBA = 1.4 * Nhops$, $pps = ((\text{mean data rate}/8) / \text{nominal } MSDU \text{ size}) + 1$, frame exchange = duration(payload size, $PHY$ rate) + $SIFS$ + $ACK$ where

Payload size =

Nominal $MSDU$ Size + 802.11 overhead + $LWAPP$ overhead +

$IP$ overhead + $UDP$ overhead + 802.11 $WDS$ overhead, and the factor "2" is used in one embodiment because a voice or video services stream is considered to be a symmetrical bi-directional stream.

The quantity MeshMT is computed on the mesh AP controller 125, or the mesh AP 107 if MAP 2 is not a lightweight AP. If the root AP controller 115 is different to the mesh AP controller 125, MeshMT is sent in a CAC inter-controller protocol message to the root AP controller 115.

Computation of $\min(1-P_b, A_v, -RR_v, -P_v)$

In one embodiment, the MeshMT is compared to a channel threshold. The assessment of the free air resources at the root AP does not depend on the fact that there is a mesh so this term is left unchanged for the mesh support. The metrics for Pb, Av, RRv and Pv are those from the root AP backhaul radio.

Since the voice or video services metrics for the root AP backhaul radio are reported by the root AP 103 to its controller 115 this computation is performed on the root AP controller 115.

Backhaul CAC Queuing Constraint

In one embodiment, an additional criterion includes comparing the packet rate to a queue utilization threshold to ensure that the number of packets entering a backhaul queue is less than the number of packets leaving the queue. In one implementation, root AP 103's controller 115 compares the packet rate to the queue threshold according to the following Backhaul CAC criterion 2 to verify that the outstanding transmit queues for voice or video services will not saturate.

Backhaul CAC criterion:

$$\text{Is } Q_o \times \frac{N_o + N_n}{N_o} < 1? \quad (5)$$

where, $N_o$ is the existing total packet per second (pps) rate in the backhaul.

$N_n$ is the pps rate of the new stream in question which is derived from the new TSPEC request, so that $(N_0+N_n)$ is the new aggregate backhaul packet rate, or percentage increase, if the current call admission request is granted.

$Q_o$ is the current/observed backhaul queue output utilization, which is a fraction that should be less than 1, that is, less than 100%, and is calculated as $$Q_o = \left(\sum T_d + \sum T_w\right) \quad (6)$$

where, $T_w$ is the time sensitive data packets, e.g., packets for voice or video services, spend waiting in front of the backhaul queue before transmission begins.

$T_d$ is the medium time consumed by the transmission of a downlink voice or video services frame in the backhaul, including retries.

An AP's MAC can keep track of these two quantities per queue. CAC criterion 1 shows how much time the output of the queue is in use (on a 1-second basis) and therefore whether there is any additional time available for new traffic streams.

While in one embodiment, the root AP and all the mesh APs perform the calculation for Backhaul CAC criterion 2, the inventors expect that if the backhaul queues in root AP 103 do not saturate, the backhaul queues in other mesh nodes also will not saturate. Thus, in one embodiment, Backhaul CAC criterion 2 is performed only at the root AP or its controller in the lightweight AP case.

One embodiment further includes the tree topology building method for the mesh taking into account the information related to time-sensitive data calls, e.g., audio or video calls, as described in more detail below. In such a method, each mesh node includes time sensitive data call information when advertising its capabilities, so that the one or more mesh nodes that are on the path between the root access point and the client station have such information and pass such information towards the root access point.

In one example implementation, the whole backhaul runs at a fixed speed. Each mesh node, e.g., mesh AP is aware of its position within the tree in the form of the number of hops from the root AP, denoted Nhops. In one embodiment, that case, rather then appending a measurement information element to the ADDTS as it is passed to the root AP, the mesh access point simply updates the access speed in the ADDTS with the mesh speed divided by Nhops.

For instance, suppose the backhaul operates at 18 Mbps. Consider a mesh AP, say mesh AP 107 that is two hops in the tree topology to the root access point, and suppose the client station 111 sends an ADDTS request that is received at mesh AP 107. The ADDTS request includes information on the access speed that the client station 111 expects to use while sending the data on the access network to the access point 107. In one embodiment, mesh AP 107 overwrites that information with 9 Mbps, representing the backhaul speed (18 Mbps) divided by the Nhops (2). As a result, the backhaul call admission method can compute a cost for that call over the multihop mesh backhaul in a similar fashion as it does traditionally for the single hop access, but with the updates speed.

Additional Call (Na) Calculation

Some embodiments include a "load-based" call admission control determination at the mesh AP, e.g., mesh AP 107 or its controller 125 if a lightweight AP that includes determining the number of calls that can still be accepted by the mesh network if the call is taken by this access point. One embodiment uses each mesh AP knowing the number, denoted N of time0sensitive data calls carried by the mesh AP. In one embodiment, this quantity is available by each mesh node advertises in its signaling up the mesh topology towards the root AP the number of time-sensitive data stream, e.g., voice or video calls that it takes from associated client devices and further from any connected-by-wire devices for time-sensitive data stream, e.g., voice or video devices such as IP telephones. This is used in one embodiment for determining the mesh topology, e.g., the tree topology. See below under "QoS-aware mesh topology building." For the load based call admission, one embodiment uses the following equation to predict the additional number of calls the access channel can accept:

$$Na1 = N \times \min(1 - P_b, A_v, -RR_v, -P_v)/P_{b\_v}. \quad (7)$$

where,

N is the number of time-sensitive data calls carried by the mesh AP, $$P_{b\_v} = \left(\frac{2 + 3R_d}{1 + R_d}\right) \times \sum T_d \quad (8)$$

$R_d$ is the average retry rate for downlink time sensitive voice packets.

$T_d$ is the medium time consumed by the transmission of a downlink voice or video services frame, including retries.

In addition, similar to the backhaul CAC criterion 2 for the backhaul, but applied to the mesh AP, $$Na2 = No/Nn*(1/Qo-1) \quad (9)$$

where, $N_o$ is the existing total packet per second (pps) rate in the channel.

$N_n$ is the pps rate of the new stream in question which is derived from the new TSPEC request, so that $(N_0+N_n)$ is the new aggregate packet rate, or percentage increase, if the current call admission request is granted at the mesh AP.

$Q_o$ is the current/observed mesh AP output queue utilization, with $$Q_o = \left(\sum T_d + \sum T_w\right)$$

where, $T_w$ is the time sensitive data packets, e.g., packets for voice or video services, spend waiting in front of the queue before transmission begins.

$T_d$ is the medium time consumed by the transmission of a downlink voice or video services frame, including retries.

And finally:

$$Na = \min(Na1, Na2) \quad (10)$$

Load-based CAC computes Na for reporting purposes. Thus, in one version of the CAC method, it is determined using a load based calculation if the mesh AP can accept the additional call.

Note again that this requires each mesh AP maintaining the quantity N, the number of calls that are active in that mesh AP.

Mesh AP Operation

The mesh AP, e.g., mesh AP 107 includes support, e.g., in its controller 125 for an access network CAC method. In one embodiment, an inter-access point protocol is implemented in each mesh AP. Using the inter-access point protocol over LWAPP enables the mesh APs to pass messages to each other. In one embodiment, each mesh AP in the path between a client station that sends an ADDTS request frame and the root AP uses the inter-access point protocol can report voice or video services metrics over LWAPP, such that the root AP or its controller has the metrics.

In one embodiment, each mesh AP maintains a metric denoted Nhops that is the mesh AP depth in the mesh tree. Thus, each mesh AP's controller has Nhops.

In an alternate embodiment, a mesh AP communicates Nhops upon creation of the LWAPP tunnel when the mesh tree topology is built. In one such embodiment, the mesh AP mobility can be taken into account to update Nhops when neighboring with a new parent.

In one embodiment, the root AP is the only mesh AP performing voice or video services metric measurements on the backhaul radio. The parameters measured are as described above, with the queues monitored being the backhaul radio voice or video services queues.

In one embodiment, each mesh AP stores information in a neighbor data structure, e.g., a mesh neighbor table, about its children. In one embodiment, in order to store and report metrics for individual mesh APs, the root AP's mesh neighbor table stores the metrics information for each of its children.

Root AP Controller or Root AP Operation

Figure 10:
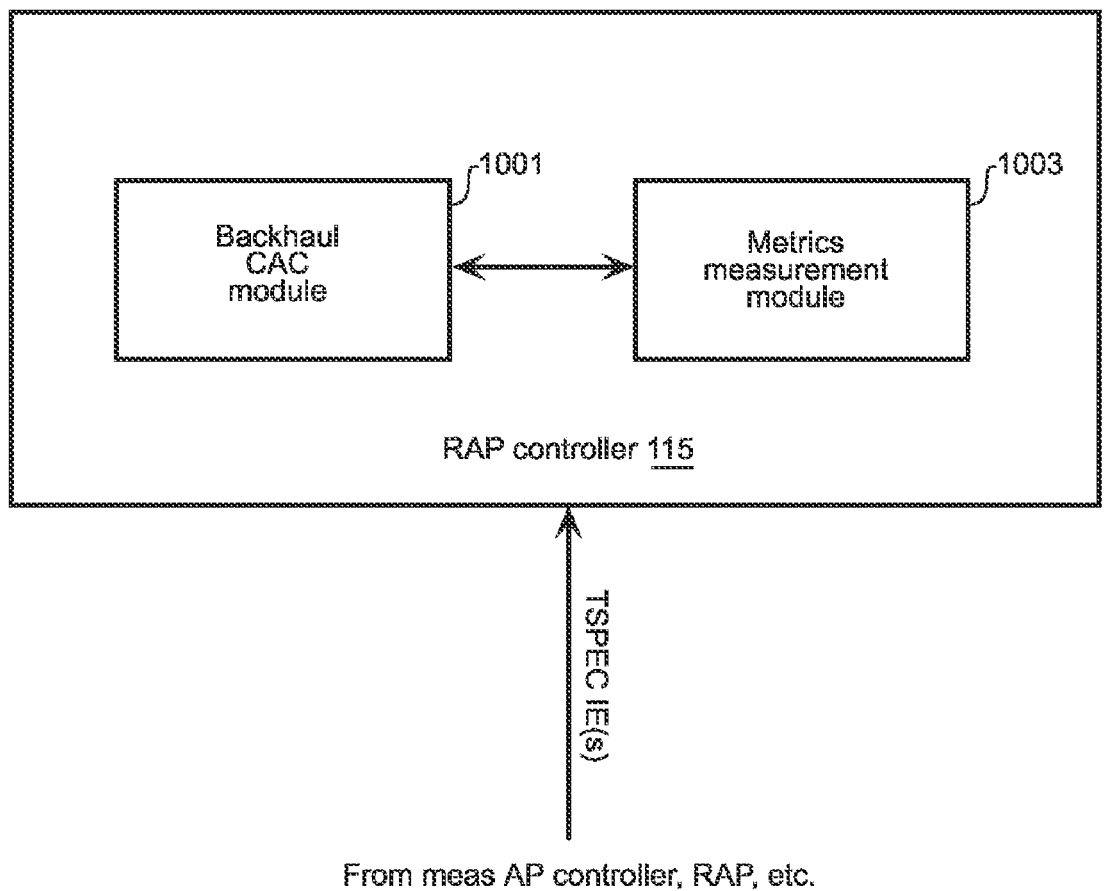
FIG. 10 illustrates an embodiment of a call admission control apparatus in a root access point, or, in the case of a lightweight access point as in the wireless communication system of FIG. 1, in the root access point controller.

FIG. 10 illustrates example components of an access point, or in the lightweight AP case, an access point controller in the wireless communication system of FIG. 1. In one embodiment, FIG. 10 shows components of the root access point controller 115. In one implementation, a metrics measurement module 1003 posts the latest measurement of backhaul metrics such as Pb, Av, RRv, Qo, No, Nn, and so forth, as described above. Information in the form of TSPEC IE(s) from a client station 111 and/or intermediate mesh APs is transferred to the root AP controller 115. The backhaul call admission control and metrics measurement modules 1001, 1003 are part of the processing system in the controller of the root AP, or in a non-lightweight AP, in the root AP. It is to be understood, however, that the backhaul CAC module 1001 may also be centrally located within a wireless control server. In this case, requests for time sensitive data metrics are sent to the mesh APs and/or root AP or its controller by the wireless control server. As the mesh APs and/or root AP or their respective controllers receive the request for time sensitive backhaul data metrics, they respond to the network device with requested backhaul data.

The root AP controller 115 or a network device that acts as a wireless control server collects the data and dynamically performs the calculations to determine the backhaul CAC metrics. If the root AP controller 115 determines that the number of calls has reached its limit based on the CAC metrics, it rejects new requests and may direct the requests to other mesh APs. The backhaul CAC module 1001 may respond to a request with a bandwidth confirm message permitting a call to be placed or a bandwidth reject message refusing to make the necessary connection for the call.

The backhaul CAC module 1001 may be a controller having a processor configured to execute software stored in memory and receive input from interfaces for use in executing the software, as described with respect to FIG. 4, for example. The processing system of FIG. 4 is only one example of a computer system suitable for use with the invention. Other devices and systems having different configurations of subsystems may also be utilized.

The following description describes implementations where the wireless network infrastructure determines whether a call admission request for a new call or for a roaming call should be admitted based on the mesh medium time, the packet rate, or a combination thereof. In the implementation described below, the backhaul call admission decisions are based on metrics observed by mesh access points on their backhaul, obviating the need for metrics observed by client stations. The call admission control method discussed below also account for time sensitive data channel reservations and roaming-in reservations which a network administrator may have configured. The backhaul CAC module 1001 and metrics measurement module 1003 of FIG. 3, and root AP controller 115, described above, may be used to implement the overall CAC method, including the backhaul CAC embodiment described below.

Figure 11:
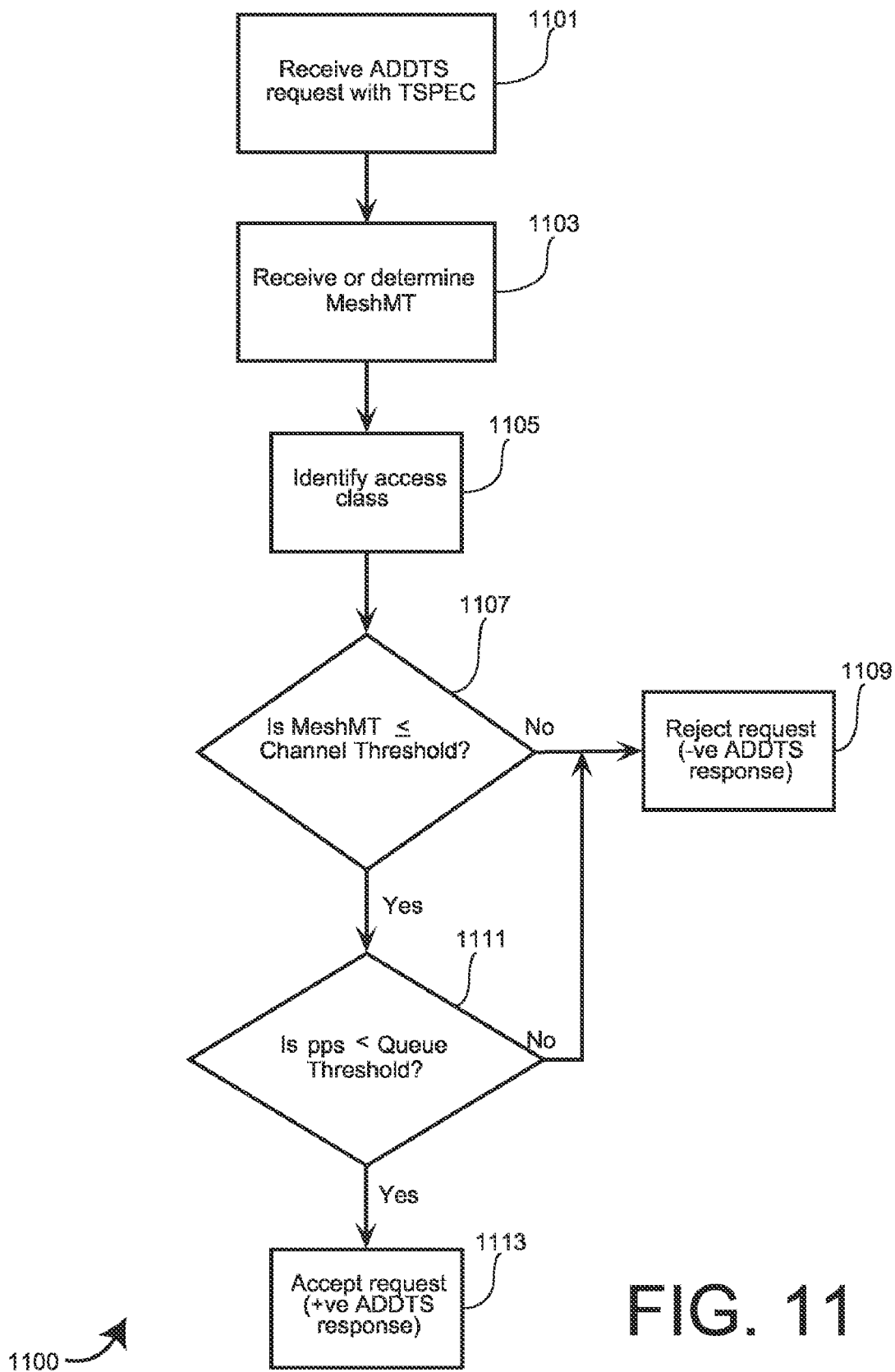
FIG. 11 illustrates a simplified flow chart of an example backhaul call admission control method operating in a controller of a root access point of a mesh network such as shown in FIG. 1, or, in an alternate embodiment in which the root access point is not a lightweight access point, in the root access point itself.

FIG. 11 illustrates an example backhaul call admission control method 1100 operating in a controller 115 of a root AP 103 of a mesh network, or, in an alternate embodiment in which the root AP is not a lightweight AP, in the root AP itself Such an alternate embodiment is the same as the case of the root AP controller being in the controller so that no encapsulation for messaging between the root AP and its controller is needed. Therefore the lightweight AP case is assumed. As FIG. 11 shows, in 1101, a root AP 103's controller 115 receives a call admission request from a client station 111, e.g., CAC ADDTS request that originated as an ADDTS frame in the a client station 111 via a mesh AP 107 and its controller 125. Note, in an alternate version, for roaming, a re-association request is received that initially was from a client station 111. As shown in 1103, the CAC ADDTS request includes a MeshMT calculation, although in an alternate embodiment, the MeshMT is calculated in the controller 115.

In one embodiment, the method includes receiving metrics from one or more mesh nodes that are on the path between the root access point 103 and the client station 111 about the respective backhaul radios of the mesh nodes. In one embodiment, the one or mesh nodes that are on the path between the client station 111 and the root access point 103 include information on the respective mesh node's backhaul radio in data with the call admission request, e.g., the ADDTS request in the form of TSPEC IE(s) as the call admission request is relayed towards the root access point, such that the receiving of the call admission request includes the receiving of the metrics. In one embodiment, the metrics for any particular mesh node in the path include at least one of the hop speed in the backhaul radio or a measure indicative of the interference level in the backhaul radio of the mesh AP.

The method 1100 includes in 1105, identifying the QoS access class of the client station 111. The method 1100 compares, in 1107, the backhaul mesh medium time MeshMT to a backhaul channel threshold calculated as described above, and in a particular embodiment, ascertaining whether the mesh medium time MeshMT is less than or equal to the channel threshold. The root AP controller 115 also compares the backhaul packet rate, e.g., in pps to a backhaul queue threshold. The comparison of the packet rate to the backhaul queue threshold is described in more detail above. In one embodiment, if the mesh medium time MeshMT is greater than the channel threshold, in 1109, the root AP controller 115 denies the request by sending a negative CAC ADDTS response, or if the packet rate is not less than the queue threshold, in 1109, the root AP controller 115 also denies the request by sending a negative CAC ADDTS response. In one embodiment, if the mesh medium time is less than or equal to the backhaul channel threshold, in 1111, the root AP controller 115 carries out the comparison of the backhaul packet rate to the backhaul queue threshold. If the packet rate is not less than the backhaul queue threshold, in 1109, the root AP controller 115 denies the request by sending a negative CAC ADDTS response. If the packet rate is less than the queue threshold, in 1113, the root AP controller 115 accepts the request by sending a positive CAC ADDTS response.

The above method can be incorporated in an existing CAC method used for the access network as follows. A hook is added to the existing access network CAC method such that upon reception of an ADDTS request or (re)-association message, the existing access network CAC method is run on the mesh AP controller 125. If the access is granted for the access radio then MeshMT is computed as described earlier. Finally a check is made to find if the mesh AP controller is also the root AP controller. If so the backhaul CAC method is run. The controller uses the backhaul radio metrics to compute the backhaul CAC bandwidth check and the backhaul CAC queuing constraint. From those checks a Yes/No answer is obtained.

If the mesh AP controller 125 is not the same as the root AP controller 115, a CAC ADDTS request or (re)-association message is sent to the root mesh AP's controller 115, in one embodiment using IP encapsulation according to an inter-controller messaging protocol, and containing the computed MeshMT. The above backhaul load-based CAC method is run at the controller and the yes/no result is sent back through a CAC ADDTS response/(re)-association response message to the mesh AP controller 125.

Finally the mesh AP controller sends its response over the LWAPP tunnel back to the mesh AP.

An inter-controller protocol is used to allow CAC communication between controllers. The following new message types are introduced: CAC ADDTS Request, CAC ADDTS Response, CAC Association Request, CAC Association Response, CAC re-association Request, and CAC re-association Response. A new mesh TSPEC payload type is introduced containing the TSPEC IE parameters required by the root AP controller to check the CAC admission criterion 1. In one embodiment, it contains a calculated value of MeshMT as calculated by the mesh AP controller based on the backhaul data rate, MSDU size, which includes 802.11, 802.11 WDS, LWAPP, UDP and IP headers, and mesh backhaul surplus bandwidth allowance.

In order for communication to occur between a lightweight mesh AP's controller and the root AP's controller, the mesh AP controller needs to know the IP address of the controller of the root AP of its tree. In one embodiment, a discovery method is used to announce the root AP controller address to all the mesh AP controllers. In another embodiment, a "Switch Announce" mobility message used for mobility support is enhanced to add a "root AP controller" flag that includes the IP address of controller 115. Of course in many implementations, the root AP controller 115 and the mesh AP's controller 125 are the same controller.

Same Backhaul and Access Radio Frequency Band

Note the much of the above description deals with the case that the mesh AP 107 has a backhaul radio interface and an access radio interface that operate at different frequency bands. When the same radio is used for access and backhaul, the access can be considered as an additional mesh hop. Therefore the only change is for MeshMT computation where meshSBA is in such an embodiment calculated as follows:

$$\text{mesh } SBA = 1.4 * (Nhops + 1).$$

While in one embodiment, only the backhaul CAC computation is carried out, in another embodiment, to maintain symmetry for debugging, and so forth, the flows are left unchanged to those in FIGS. 5 to 9.

QoS-Aware Mesh Topology Building

AWPP uses such metrics as speed, interference, SNR and so on to build a tree topology. All nodes in the mesh network measure the properties of its links with peer nodes such as speed, interference, SNR and so on. These measurements are called "routing metrics" and are used, together with the criteria mentioned above, to determine the routing topology of the mesh network. But such metrics do not help to build a topology that addresses the number of calls that can be addressed. As a result, one structure with good radio quality might saturate while the next could be mostly free.

When wireless mesh networks are used for time sensitive data such as voice, e.g., for wireless voice over IP (VoIP) telephony, there are requirements on the links concerning data rate, delay and delay jitter. These metrics are called "QoS metrics". In order to support voice communications over mesh networks, the mesh topology should be based not only on the conventional routing metrics but also on QoS metrics. This is called QoS aware topology creation.

One embodiment of the invention includes building a tree topology between mesh nodes with an awareness of the QoS requirements for time sensitive data streams, e.g., voice or video data services streams. Thus, the tree topology creation in one embodiment takes into account mesh metrics that based on the capability of the trees to serve time-sensitive packet flows, in particular, those for voice telephone calls or video-teleconference calls.

In one embodiment, the mesh network is organized in a tree topology between mesh nodes, with, as shown in FIG. 1, the root AP 103 being the root of the tree topology and providing connectivity to a wired network 117. In the discussion herein, each mesh node is a mesh AP. Those in the art will understand that each mesh node need not include the access point functionality. Such a mesh point is then a relay point, and such a relay point can be considered a mesh AP with no client stations associated. Therefore, those in the art will understand that there is no loss of generality by considering each mesh node to be a mesh AP.

In a tree topology of a mesh network, each parent mesh AP is the "root" of a subtree mesh APs that are children, children of children, and so forth. The routing tree topology is created and maintained by signaling between mesh nodes up and down the tree.

One embodiment of the present invention uses combined metrics that couple conventional routing metrics such as those used by AWPP and other tree building methods, and QoS metrics, for example, QoS metrics used in both the access network CAC method and the backhaul CAC method, such that a mesh node may join a tree, or roam between trees, based on the capability of the trees to serve QoS packet streams, also called time-sensitive data packet streams herein, e.g., voice phone call packet streams and videoconferencing call packet streams. These combined metrics are called QoS routing metrics herein.

In one embodiment, each mesh node receives QoS metrics, and computes (or its controller computers) the cost, in terms of networking resources, in particular the air protocol, for time-sensitive data calls originated from its subtree.

Consider a particular subtree denoted subtree, and denote the cost of a time sensitive packet stream call from that subtree by load (subtree). In one embodiment, the method enables the root AP of the mesh, the tree of the mesh denoted by tree, to pass the cost of the subtrees, as well as the total cost of the whole tree, load (tree), down the tree, such that each mesh node, e.g., each mesh AP is able to compute (load(tree)−load(subtree)), which is the load of the tree if that mesh node and all its attached children were not in the mesh network.

To avoid instability, in one embodiment, each mesh node determines its (load(tree)−load(subtree)), which is the load (tree) from its present parent, less its load(subtree). A mesh AP can now decide whether to roam, that is, whether it is more or less costly to change its parent in order to potentially increase the chances for successfully supporting more time-sensitive data calls, e.g., voice or video services calls. The ascertaining whether to roam is by comparing the load of its present parent if it was not the child of that parent to the load of a potential new parent. That is, the child mesh AP compares (load(tree)−load(subtree)) using load(tree) of its present parent, with load(tree) of a potential parent.

Determining the Quantity load(tree)−load(subtree)

Sending QoS Metrics Down the Tree

One embodiment of the tree topology building method includes QoS routing metrics being sent down the tree away from the root AP, such that each mesh node is aware of the radio characteristics of the backhaul up the tree all the way to the root AP.

One embodiment of the tree topology building method includes each mesh AP sending a discovery message to its potential neighbors that includes QoS routing metrics. A potential child mesh AP evaluates the discovery messages from the mesh AP that it receives to ascertain if it should request joining the tree with that particular parent mesh AP. The discovery messages with QoS routing metrics from different mesh nodes are propagated down the tree as each mash node joins the tree. In one embodiment, as tree discovery messages are propagated down the tree, each mesh node, e.g., each mesh AP on the way down the tree includes, e.g., appends QoS routing metrics of its backhaul radio between that mesh AP and its parent mesh node, e.g., parent mesh AP.

By the discovery message received by a mesh AP including the routing metrics on the backhaul radios each mesh node between the receiving mesh AP and the root AP, each mesh AP in the mesh network knows the backhaul radio characteristics of each hop down the tree to its immediate parent.

One embodiment includes using this information in selecting a parent mesh node, e.g., a parent mesh AP. In particular, when a node with no active calls looks up which of its neighbors to have as its parent in a tree, all other metrics being equal, the node will select the parent with the smaller tree load.

Sending QoS Metrics Up the Tree

In one embodiment, furthermore, each mesh node advertises in its signaling up the tree towards the root AP the number of time-sensitive data stream, e.g., voice or video calls that it takes from associated client devices and further from any connected-by-wire devices for time-sensitive data stream, e.g., voice or video devices such as IP telephones. As a result, any mesh node, e.g., mesh AP in the tree topology mesh network knows how many time-sensitive data streams, e.g., voice or video calls originate from its subtree. Each mesh node also knows, for each particular time-sensitive data stream call, e.g., voice or video call, which particular mesh node the particular client station for the particular call is wirelessly associated with, or in the case of a wired connection, which mesh node the client station is coupled to.

In one embodiment, each mesh node signals the QoS routing metrics for the hop between the mesh node and its parent is signaled up the tree all the way to the root AP, such that QoS routing metrics are propagated up the tree. In one embodiment, as described above, this signaling is carried out at least when a new call is requested for the purpose of call admission control. As a result of the signaling of the QoS routing metrics up the tree, each mesh node known the QoS routing metrics of all the hops between it and the mesh node, e.g., mesh AP to which the client station of a call is associated for each active call.

From a particular mesh node knowing the number of active calls originating in its subtree, and for each such active call, the originating mesh node and the client with which the call is involved, and further from knowing the routing metrics between the particular mesh node and the originating mesh node for each active call in the particular mesh node's subtree, the mesh node knows for each call the backhaul radio metrics between it and the originating node that accepted the call. It is thus capable of computing the resource usage in terms of air protocol, for each call in its subtree, and sums them up for its subtree. From above, for each call in its subtree, the particular mesh node knows the routing metrics between it and the root of the tree. This of course is independent of the number of calls. The quantity load(subtree) is obtained by this sum of the calls from the originating node to the subtree root a call dependent amount since it depends on the originating code's depth in the subtree, and the routing metrics between the mesh node and the root of the tree.

In the same way as each mesh node obtains its load(subtree), the root AP obtains load(tree).

In one embodiment, load(tree) is included in each discovery message sent by a mesh AP as part of the tree discovery protocol so that every mesh node in the tree knows the global load(tree) as well as its local load(subtree).

Any mesh node can thus compute (load(tree)–loads(subtree)) and compare that with the load factors of the other potential parents in the same or other trees to decide if it should roam or not.

In the above example of building the routing topology, the topology was a tree topology. The invention however applies to any routing topology.

Although the present invention disclosed herein is described in the context of time sensitive data packets, e.g., packets for voice or video services, the present invention may apply to packets of other QoS access classes (e.g., video packets, etc.), and still remain within the spirit and scope of the present invention.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device," "STA," and "wireless client station" may be used interchangeably to describe any of those multiple other electronic devices, which may have the capability to be moved and still communicate, though movement is not a requirement. However, the scope of the invention is not limited to devices that are labeled with those terms.

While some embodiments have been described for operation with mesh access points that include a backhaul radio with RF frequencies in the 5 GHz range and access radio with RF frequencies in the 2.4 GHz range, e.g., the 802.11a and 802.11b,g variants of the IEEE 802.11 standard, respectively, the invention may be embodied using receivers and transceivers operating in other RF frequency ranges. Furthermore, the invention also may be embodied using mesh APs that use the same frequency range for the access and for the backhaul. Furthermore, while a transceiver embodiment for operation conforming to the IEEE 802.11 standard has been described, the invention may be embodied in a mesh network conforming to other standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Alternate embodiments invention also may be embodies in a method in which the protocols are communicated in a media independent fashion, for instance extending IPv6 neighbor discovery.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, embodiments that implement each of the methods described herein are each in the form of a logic encoded in one or more tangible media for execution and when executed operable to carry out the method. The logic, for example, may be in the form of a set of instructions, e.g., a computer program carried a computer-readable carrier medium for execution on one or more processors, e.g., one or more processors that are part of an access point that acts as a root access point, or a controller of a lightweight access point that acts as a root access point. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing a set of instructions for execution by one or more of the processors and that cause the one or more processors to perform any one or more of the methodologies of the present invention. A carrier medium may take many forms, including but not limited to, non-volatile media, and volatile media. Non-volatile media includes, for example, optical, magnetic disks, and magneto-optical disks. Volatile media includes dynamic memory, such as main memory. For example, the term "carrier medium" shall accordingly be taken to included, but not be limited to, solid-state memories, and a computer product embodied in optical and magnetic media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
   tracking bandwidth utilization of a wireless backhaul network of a wireless mesh network, the wireless mesh network comprising a root access point and one or more mesh nodes, one or more of which are mesh access points, the wireless backhaul network operative to link the mesh access points and the root access point with a set of backhaul links that form a tree topology in which the root access point is the root of the tree topology, wherein an access network is formed for communicating to and from a client station of any mesh access point via the root access point, wherein the tracking comprises receiving metrics from the one or more mesh nodes that are on a path between the root access point and the client station about the respective backhaul radios of the mesh nodes that are on the path;
   receiving a call admission request for a time sensitive packet data call from a client station of a first mesh access point of the wireless mesh network, the call admission request identifying a QoS access class;
   ascertaining using the tracked bandwidth utilization whether or not the backhaul network is likely to have sufficient capacity to carry the call, the ascertaining using a backhaul call admission control method operative to carry out the ascertaining, the backhaul call admission method comprising:
      computing a first allocation of bandwidth for the call admission request; and
      approving the call if the computed first allocation is less than an amount of the backhaul bandwidth available to a QoS access class identified in the call admission request; and
   in the case that the ascertaining ascertains that the wireless backhaul network is likely to have sufficient capacity for the call and further, in the case that an access level call admission control method operative to ascertain whether the access network is likely to have sufficient bandwidth to carry the call, ascertains to approve the call at the access network level, sending a positive call admission response,
   wherein at least one of A and B,
   A being that the available amount of the backhaul bandwidth is based on one or more of an access category bandwidth reservation, a roaming-in bandwidth reservation and the tracked utilization of the backhaul bandwidth corresponding to the QoS access class identified in the call admission request, and
   B being that the method further comprises estimating a queue utilization for the call admission request based on the current backhaul queue utilization of the QoS access class identified in the call admission request and one or more QoS parameters in the call admission request, and, wherein approval of the call admission request in the backhaul is further conditioned on the estimated backhaul queue utilization not exceeding a queue utilization threshold.

2. A method as recited in claim 1, wherein the available amount of the backhaul bandwidth is based on one or more of an access category bandwidth reservation, a roaming-in bandwidth reservation and the tracked utilization of the backhaul bandwidth corresponding to the QoS access class identified in the call admission request.

3. A method as recited in claim 1, further comprising estimating a queue utilization for the call admission request based on the current backhaul queue utilization of the QoS access class identified in the call admission request and one or more QoS parameters in the call admission request, and, wherein approval of the call admission request in the backhaul is further conditioned on the estimated backhaul queue utilization not exceeding a queue utilization threshold.

4. A method comprising:
  receiving a call admission request for a call from a client station of a first mesh access point of a wireless mesh network that comprises a root access point and one or more mesh nodes, the mesh nodes including mesh access points comprising the first mesh access point, the wireless mesh network operative to maintain a tree topology for backhaul links between the mesh access points and root access point in which the root access point is the root of the tree, the call admission request comprising the bandwidth requirement for the call;
  receiving metrics from one or more mesh nodes that are on the path between the root access point and the client station about the respective backhaul radios of the mesh nodes; and
  ascertaining whether the backhaul can support the call, the ascertaining using the received metrics about the backhaul radios,
  wherein the ascertaining of whether the backhaul can support the call comprises at least one of the set consisting of (a) comparing the backhaul mesh medium time to a backhaul channel threshold, (b) comparing the backhaul packet rate to a backhaul queue utilization threshold to ensure that the number of packets entering a backhaul queue is less than the number of packets leaving the queue, and (c) determining a number of calls that can still be accepted by the mesh network.

5. A method as recited in claim 4, wherein the backhaul uses the same wireless frequency band as the link between the first mesh access point and its client stations.

6. A method as recited in claim 4, wherein the backhaul uses a different wireless frequency band than the link between the first mesh access point and its client stations, wherein the first mesh access point comprises a radio interface for the backhaul and an access radio interface, and wherein the overall call admission control comprises the ascertaining whether the backhaul can support the call and access-level call admission control to ascertain whether the first mesh access point can accept the call on its access radio interface.

7. A method as recited in claim 4, wherein the root access point of the mesh network is a lightweight access point that has a controller, and wherein the method is implemented in the controller of the root access point.

8. A method as recited in claim 7, wherein the first mesh access also is a lightweight access point, and wherein the access level call admission control method is implemented in the controller of the first mesh access point.

9. A method as recited in claim 8, wherein the root access point and the first mesh access point have different controllers, and wherein the controller of the first access point communicates with the controller of the root access point using an inter-controller messaging protocol.

10. A method as recited in claim 4, wherein the method is implemented in the root access point of the mesh network.

11. A method as recited in claim 4, wherein one or more mesh nodes that are on the path between the root access point and the client station comprise information on the respective mesh node's backhaul radio in data with the call admission request as the call admission request is relayed towards the root access point, and wherein the receiving of the call admission request comprises the receiving of the metrics.

12. A method as recited in claim 11, wherein the metrics for any particular mesh node in the path comprise at least one of hop speed in the backhaul radio or a measure indicative of the interference level in the backhaul.

13. A method as recited in claim 12, wherein the backhaul of the mesh network runs at a fixed speed, wherein the call admission request comprises an access speed, wherein the mesh nodes of the mesh network form a tree topology in which each mesh node from which metrics are received maintains knowledge of its position in the tree topology, comprising the number of hops to the root access point, and information on the respective mesh node's backhaul radio included in the data with the call admission request with an updated backhaul hop speed quantity that varies as the fixed speed divided by the number of hops to the root access point, and wherein a cost for the requested call over the mesh backhaul can be calculated as if for a single hop access.

14. A method as recited in claim 4, wherein the ascertaining of whether the backhaul can support the call comprises comparing the backhaul mesh medium time to a backhaul channel threshold.

15. A method as recited in claim 4, wherein the ascertaining of whether the backhaul can support the call comprises comparing backhaul packet rate to a backhaul queue utilization threshold to ensure that the number of packets entering a backhaul queue is less than the number of packets leaving the queue.

16. A method as recited in claim 4, wherein the ascertaining of whether the backhaul can support the call comprises determining the number of calls that can still be accepted by the mesh network.

17. A method as recited in claim 4, wherein the topology of the mesh is determined by a mesh topology method that comprises:
  transmitting by each mesh node of the wireless mesh network a respective discovery message that includes one or more QoS routing metrics,
  wherein the mesh routing topology takes into account QoS data; and
  wherein discovery messages are propagated down the tree as each mesh node joins the mesh topology.

18. A method as recited in claim 17, wherein the mesh topology method further comprises:
  each mesh node signaling QoS routing metrics for the hop between the mesh node and its parent up the mesh topology all the way to the root access point, wherein QoS routing metrics are propagated up the tree,
  wherein each mesh node can compute the resource usage in terms of air protocol, for each call in the subtree of the topology of which it is the root, and sum the resource usages to obtain a measure of the load of its subtree.

19. A method as recited in claim 17, wherein the mesh topology method further comprises:
  the root access point signaling the total load of the tree to each mesh node in the mesh network,
  wherein a particular mesh node can determine the load of the mesh topology if that particular mesh node's subtree was not in the mesh network, the particular mesh node's subtree including the particular mesh node and all mesh nodes that are directly or indirectly connected to the particular mesh node down the tree topology in the mesh network, the determining being by subtracting a measure of the load of the particular mesh point's subtree from a measure of the total load of the topology, and wherein the particular mesh node advertises the determined load of the mesh topology less the particular mesh node's subtree load to provide for a potential child mesh node a measure to use in determining whether or not to join the mesh topology via the particular mesh point.

20. A computer readable hardware storage medium encoding instructions that when executed by one or more processors of a processing system cause are operative to:
- track bandwidth utilization of a wireless backhaul network of a wireless mesh network, the wireless mesh network comprising a root access point and one or more mesh nodes, at least one or more of which is a mesh access point, the wireless backhaul network operative to link the mesh access points and the root access point with a set of backhaul links that form a tree topology in which the root access point is the root of the tree topology, wherein an access network is formed for communicating to and from a client station of any mesh access point via the root access point, wherein each of the mesh nodes sends time sensitive data call information to the root access point during the tracking;
- receive a call admission request for a time sensitive packet data call from a client station of a first mesh access point of the wireless mesh network;
- ascertain using the tracked bandwidth utilization whether or not the wireless backhaul network is likely to have sufficient capacity to carry the call, the ascertaining using a backhaul call admission control method operative to carry out the ascertaining, the backhaul call admission method comprising:
  - computing a first allocation of bandwidth for the call admission request; and
  - approving the call if the computed first allocation is less than an amount of the backhaul bandwidth available to a QoS access class identified in the call admission request; and
- send a positive call admission response in the case that the ascertaining ascertains that the backhaul network is likely to have sufficient capacity for the call and that an access level call admission control method operative to ascertain whether the access network is likely to have sufficient bandwidth to carry the call, ascertains to approve the call at the access network level,
- wherein at least one of A and B,
  - A being that the available amount of the backhaul bandwidth is based on one or more of an access category bandwidth reservation, a roaming-in bandwidth reservation and the tracked utilization of the backhaul bandwidth corresponding to the QoS access class identified in the call admission request, and
  - B being that the instructions when executed are further operative to estimate a queue utilization for the call admission request based on a current backhaul queue utilization of the QoS access class identified in the call admission request and one or more QoS parameters in the call admission request, and, wherein approval of the call admission request in the backhaul is further conditioned on an estimated backhaul queue utilization not exceeding a queue utilization threshold.

21. A computer readable hardware storage medium as recited in claim 20, wherein the instructions that when executed are operative to ascertain whether to approve the call admission request using the backhaul call admission control method are in the root access point of the mesh network and in the case of a root access point that is a lightweight access point, in a controller of the root access point.

22. A computer readable hardware storage medium as recited in claim 20, wherein the available amount of the backhaul bandwidth is based on one or more of an access category bandwidth reservation, a roaming-in bandwidth reservation and the tracked utilization of the backhaul bandwidth corresponding to the QoS access class identified in the call admission request.

23. A computer readable hardware storage medium as recited in claim 20, the instructions when executed are further operative to estimate a queue utilization for the call admission request based on the current backhaul queue utilization of the QoS access class identified in the call admission request and one or more QoS parameters in the call admission request, and, wherein approval of the call admission request in the backhaul is further conditioned on the estimated backhaul queue utilization not exceeding a queue utilization threshold.

24. A computer readable hardware storage medium encoding instructions that when executed by one or more processors of a processing system are operative to:
- receive a call admission request for a call from a client station of a first mesh access point of a wireless mesh network that comprises a root access point and one or more mesh access points comprising the first mesh access point, the mesh network operation comprising maintaining a tree topology for backhaul links between the mesh access points and root access point in which the root access point is the root of the tree, the call admission request comprising the bandwidth requirement for the call;
- receive metrics from one or more mesh nodes that are on the path between the root access point and the client station about the respective backhaul radios of the mesh nodes; and
- ascertain whether the backhaul can support the call, the ascertaining using the received metrics about the backhaul radios,
- wherein overall call admission control to ascertain whether or not the call is to be accepted comprises the ascertaining whether the backhaul can support the call, and
- wherein the ascertaining of whether the backhaul can support the call comprises at least one of the set consisting of (a) comparing backhaul mesh medium time to a backhaul channel threshold, (b) comparing backhaul packet rate to a backhaul queue utilization threshold to ensure that the number of packets entering a backhaul queue is less than the number of packets leaving the queue, and (c) determining the number of calls that can still be accepted by the mesh network.

25. A computer readable hardware storage medium as recited in claim 24, wherein the instructions that when executed are operative to ascertain whether the backhaul can support the call are in the root access point of the mesh network and in the case of a root access point that is a lightweight access point, are in a controller of the root access point.

* * * * *

UNITED STATES PATENT AND TRADEMARK OFFICE
CERTIFICATE OF CORRECTION

| | | |
|---|---|---|
| PATENT NO. | : 7,822,064 B2 | Page 1 of 1 |
| APPLICATION NO. | : 11/537728 | |
| DATED | : October 26, 2010 | |
| INVENTOR(S) | : Thubert et al. | |

It is certified that error appears in the above-identified patent and that said Letters Patent is hereby corrected as shown below:

In Column 28, line 20, after "about", kindly delete the word "the".
In Column 28, line 27, before "backhaul", kindly insert the word --wireless--.
In Column 28, line 38, after "ascertains that the", kindly delete the word "wireless".
In Column 28, line 55, before "current", kindly delete the word "the".
In Column 28, line 59, after "conditioned on", kindly delete the word "the".
In Column 29, line 22, after "about", kindly delete the word "the".
In Column 29, line 29, after "comparing", kindly delete the word "the".
In Column 29, line 30, after "comparing", kindly delete the word "the".
In Column 30, line 5, before "hop", kindly insert the word --a--.
In Column 30, line 22, before "backhaul mesh medium", kindly delete the word "the".
In Column 32, line 37, after "about", kindly delete the word "the".

Signed and Sealed this
Fifteenth Day of February, 2011

David J. Kappos
*Director of the United States Patent and Trademark Office*